US006789962B2

(12) United States Patent
Matsunaga et al.

(10) Patent No.: US 6,789,962 B2
(45) Date of Patent: Sep. 14, 2004

(54) PRINTING APPARATUS AND COMMUNICATION APPARATUS

(75) Inventors: Shigeki Matsunaga, Kadoma (JP); Kazuyuki Murata, Kyotanabe (JP); Yuji Okada, Setagaya-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/422,747

(22) Filed: Apr. 25, 2003

(65) Prior Publication Data

US 2003/0202831 A1 Oct. 30, 2003

(30) Foreign Application Priority Data

Apr. 26, 2002 (JP) ...................................... 2002-126812

(51) Int. Cl.[7] ............................ B41J 21/17; B41J 3/44; G06F 15/00

(52) U.S. Cl. .......................... 400/70; 400/76; 358/1.15

(58) Field of Search .......................... 400/70; 358/1.15, 358/1.16, 1.14, 1.9

(56) References Cited

U.S. PATENT DOCUMENTS

| | | | | | |
|---|---|---|---|---|---|
| 5,548,691 | A | * | 8/1996 | Sato et al. | 358/1.14 |
| 5,872,900 | A | * | 2/1999 | Tsuchitoi | 358/1.12 |
| 6,149,323 | A | * | 11/2000 | Shima | 400/76 |
| 6,469,803 | B1 | * | 10/2002 | Kato | 358/1.9 |
| 6,545,767 | B1 | * | 4/2003 | Kuroyanagi | 358/1.14 |
| 6,565,174 | B2 | * | 5/2003 | Kamoshida et al. | 347/12 |
| 6,684,768 | B2 | * | 2/2004 | Miyata et al. | 101/128.4 |
| 2002/0001104 | A1 | * | 1/2002 | Shima | 358/442 |
| 2002/0015514 | A1 | * | 2/2002 | Kinjo | 382/118 |
| 2002/0044298 | A1 | * | 4/2002 | Kaneko et al. | 358/1.15 |
| 2003/0007168 | A1 | * | 1/2003 | Takahashi | 358/1.15 |

* cited by examiner

*Primary Examiner*—Andrew H. Hirshfeld
*Assistant Examiner*—Wasseem H. Hamdan
(74) *Attorney, Agent, or Firm*—Wenderoth, Lind & Ponack, L.L.P.

(57) ABSTRACT

A printer includes a communication unit which receives a plurality of pictures to be printed, in which pictures video on a TV are captured, a command receiving unit which receives a user input of a print setting for specifying a sectioning method of a print sheet, an outputting unit which prints the received pictures on the print sheet according to the print setting, and a control unit which controls the outputting unit to stand by for the pictures until they are received by the number corresponding to number of printing areas obtained by sectioning the print sheet.

10 Claims, 25 Drawing Sheets

Fig. 10

930

JOB ID: job 001
PATH (URI): /usr/spool/job001/
print1.xml (content 1000)
STATUS: under process of printing
UNIT: 1
SIDE: one-side
PAPER SIZE: A4
TYPE OF PAPER: standard paper
MONOCHROME/COLOR: monochrome
PRINTING QUALITY: standard
TEMPORARY STOP: valid
. . .

931

JOB ID: job 002
PATH (URI): /usr/spool/job001/
print2.xml (content 1400)
STATUS: stand by for printing
UNIT: 3
SIDE: one-side
PAPER SIZE: A4
TYPE OF PAPER: standard paper
MONOCHROME/COLOR: color
PRINTING QUALITY: high-grade
TEMPORARY STOP: valid
. . .

932

JOB ID: job 003
PATH (URI): /usr/spool/job001/
print3.xml (content 1053)
STATUS: under process of printing
UNIT: 1
SIDE: one-side
PAPER SIZE: A4
TYPE OF PAPER: standard paper
MONOCHROME/COLOR: monochrome
PRINTING QUALITY: standard
TEMPORARY STOP: invalid
. . .

PRINTING APPARATUS AND COMMUNICATION APPARATUS

BACKGROUND OF THE INVENTION (1) Field of the Invention

The present invention relates to a printing apparatus which performs an N-column printing for hardcopies of pictures that are received from outside sources, and a communication apparatus which provides data to the printing apparatus.

(2) Description of the Related Art

When a user prints data such as pictures and documents that are created by a PC (Personal Computer), the PC creates print data which has a printing page as a unit. FIG. 1A is a diagram showing an example of a picture which is targeted for printing by the printer. FIG. 1B is a diagram showing an example of print data that is created by the PC as the picture which is targeted for printing as shown in FIG. 1A. When printing the picture shown in FIG. 1A, for example, the picture is transformed into print data that is sectioned by a unit of pages as shown in FIG. 1B at the PC, and the print data is sent from the PC to the printer. The printer performs print processing based on the print data sent from the PC.

The prior method as described above, however, has often caused a waste of paper since printed matters with a good part of blank space on the last page are created when the last page has still much blank space left thereon.

SUMMARY OF THE INVENTION

The present invention has been devised in view of these circumstances. It is therefore an object of the present invention to provide a printing apparatus which reduces the blank space of a print sheet so as to use the print sheet efficiently, and to provide a communication apparatus which provides data to the printing apparatus.

The printing apparatus of the present invention for achieving the above-described object Is a printing apparatus for printing a plurality of pictures on a plurality of printing areas that are obtained by sectioning a print sheet. The printing apparatus of the present invention comprises the following units: a picture receiving unit operable to receive a plurality of pictures to be printed; a print setting input unit operable to receive, from a user, an input of a print setting for specifying a sectioning method; a printing unit operable to print the received pictures on print sheets according to the print setting; a print control unit operable to stand by for the reception of the pictures in the picture receiving unit, to control the printing unit so as to execute printing of the pictures when the pictures are received by the number which is printable in the predetermined printing areas, and to stand by again; and a paper forwarding control unit operable to temporarily stop paper forwarding of the print sheet while the print control unit is standing by. Accordingly, in the printing apparatus of the present invention, the paper forwarding control unit temporarily stops paper forwarding of the print sheet while the print control unit is standing by. Therefore, after printing on the predetermined area, for instance, the print sheet is not forwarded as long as it has a predetermined amount of blank space, and the print control unit stands by until a picture to be printed next has been received so that the printing continues from the position where the print sheet was stopped the last time when a picture to be printed next is received. Therefore, the printing area of the print sheet Is used without waste so that an N-column printing can be realized.

Also, the printing apparatus of the present invention is a printing apparatus for printing a plurality of pictures on a plurality of printing areas that are obtained by sectioning a print sheet. The printing apparatus of the present invention comprises the following units: a picture receiving unit operable to receive a plurality of pictures to be printed; a print setting input unit operable to receive, from a user, an input of a print setting for specifying a sectioning method; a printing unit operable to print the received pictures on print sheets according to the print setting; and a print control unit operable to have the printing unit stand by for printing the pictures until the pictures are received by the number corresponding to the number of printing areas that are obtained by sectioning a print sheet. Thus, in the printing apparatus of the present invention, the print control unit has the printing unit stand by for printing the pictures until the pictures are received by the number corresponding to the number of printing areas obtained by sectioning a print sheet. Therefore, the printing apparatus stands by for the printing until the pictures are received by the number to be located in all of the printing areas of the print sheet. Even in a case where a printing apparatus is a page printer, the received pictures can be N-column printed without producing wasted blank space on the print sheet.

The printing apparatus of the present invention is useful as a page printer such as a laser printer, and especially as a line printer such as an ink-Jet printer. The communication apparatus is useful as a printer connected to a PC and a PDA, and especially as a DTV and a set top box (STB).

As for the further information about the technical background of this application, Japanese Patent Application No. 2002-126812, filed Apr. 26, 2002, is incorporated herein by reference.

BRIEF DESCRIPTION OF THE DRAWINGS

These and other objects, advantages and features of the present invention will become apparent from the following description when taken in conjunction with the accompanying drawings which illustrate specific embodiments of the present invention.

FIG. 10 is a diagram showing an example of job information 930–932 that are created by a JOB management unit 813 shown in FIG. 9.

DETAILED DESCRIPTION OF THE INVENTION

The present invention is not limited to the embodiments described below, and a wide range of variations or modifications within the scope of the following claims are possible. The following describes the embodiments of the present invention in detail with reference to the attached drawings.

First Embodiment

In a first embodiment of the present invention, a printing system for N-column printing of the hardcopy of a screen that is displayed on the TV is explained with reference to FIGS. 2–5.

Figure 1A:
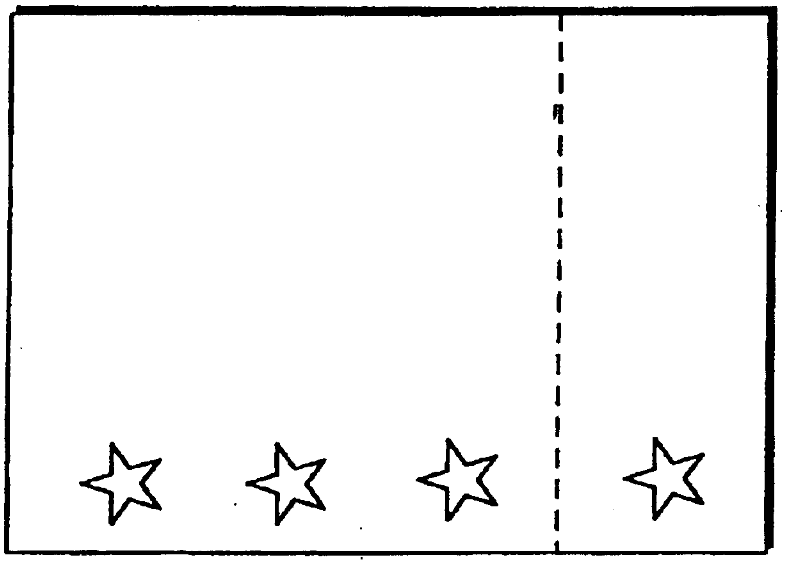
Prior Art Fig. 1A
FIG. 1A is a diagram showing an example of a picture that is targeted for printing by a printer.
Figure 1B:
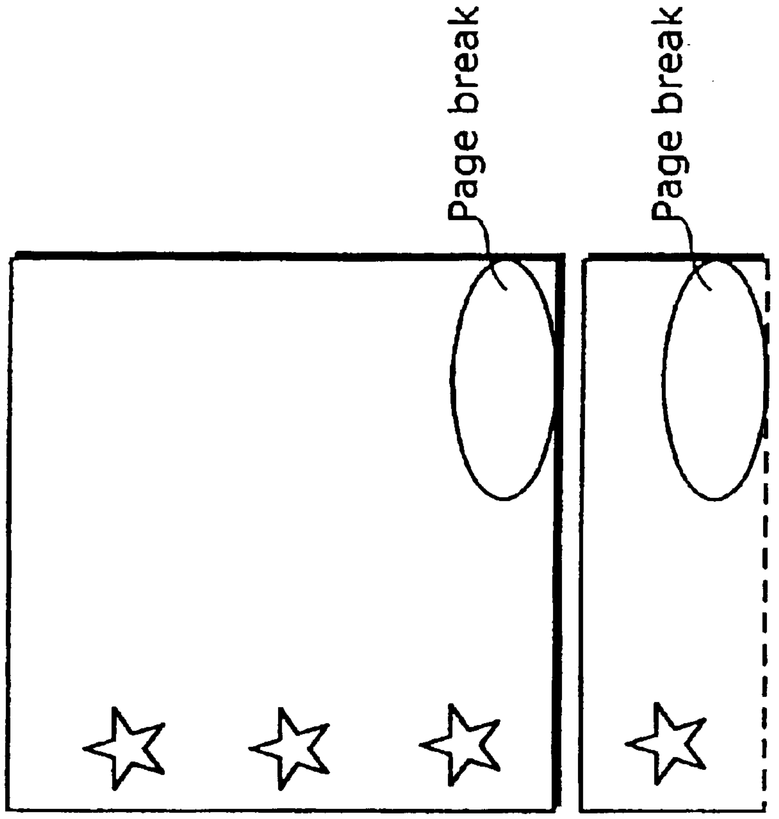
Prior Art Fig. 1B
FIG. 1B is a diagram showing an example of print data that is created by a PC having the picture shown in FIG. 1A as an object for printing.
Figure 2:
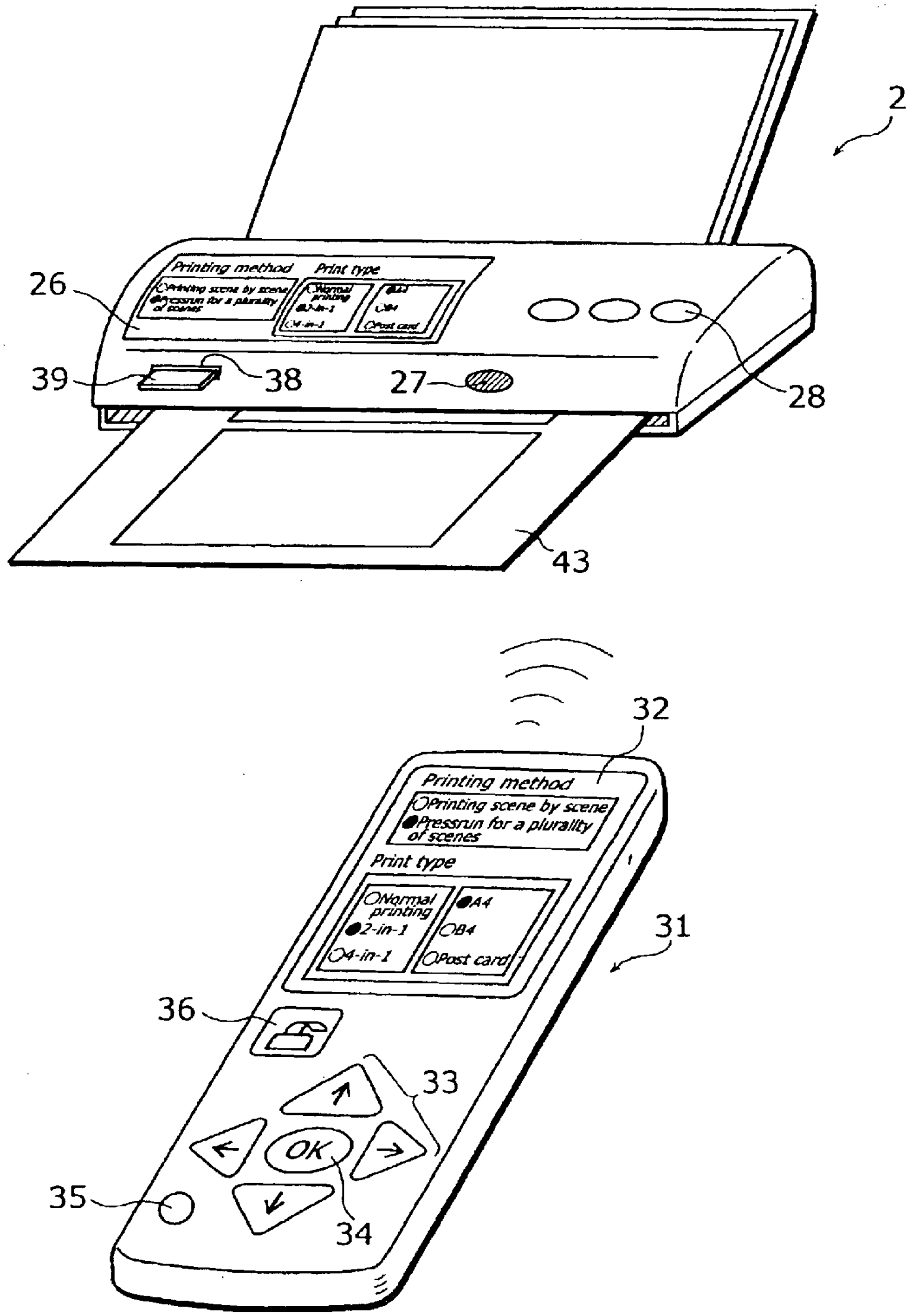
FIG. 2 is an illustration showing examples of external views of a printer 2 and a remote controller 31, respectively, that are included in a printing system according to a first embodiment of the present invention.

FIG. 2 is a diagram showing examples of external views of a printer 2 and a remote controller 31, respectively, that are included in a printing system according to the first embodiment. As shown in FIG. 2, the printer 2 includes in the main body a display unit 26 such as a liquid crystal display panel, a command receiving unit 27 which receives commands for a print setting by infra-red radiation from the remote controller 31, and an input operating unit 28 such as a push button. The user can perform a desired print setting by operating the input operating unit 28 while looking at a print setting screen that is displayed on the display unit 26 included in the main body of the printer 2. The remote controller 31, for instance, includes a display unit 32 which has a liquid crystal display panel or the like for displaying a print setting screen of the printer 2 in accordance with a program that is stored in the remote controller 31, cursor keys 33 for shifting a cursor on the input screen that is displayed on the display unit 32, a select key 34 for determining an option for an item which the cursor indicates, a send key 35 for sending the selected contents to the printer 2, and a forced paper forwarding key 36 for forwarding a print sheet 43 forcedly while paper forwarding of the printer 2 is suspended according to the print setting by deactivating the setting temporarily. The user therefore can perform the print setting of the printer 2 easily by operating the cursor keys 33, the select key 34 and the send key 35 while looking at the print setting screen that is displayed on the display unit 32 of the remote controller 31 when the user is away from the main body of the printer 2. Also, the user can print sequentially under the same print setting after temporarily deactivating the setting for paper forwarding with ease even when the user is distanced from the printer 2. It is also shown in FIG. 2 that the display unit 26 and the input operating unit 28 that are included in the printer 2 are separate units; however, the display unit 26 and the input operation unit 28 may instead be a combined tablet. The same can be said for the display unit 32 and the operation keys (the cursor keys 33, the select key 34, the send key 35 and the forced paper forwarding key 36, etc.) of the remote controller 31.

The printer 2 includes a PC card slot 38 in which a PC card 39, which is a detachable storage medium, may be inserted.

Also, the display unit 26 of the printer 2 may be a video output terminal for displaying a user interface for printer-use on a TV, instead of a liquid crystal display panel.

Figure 3:
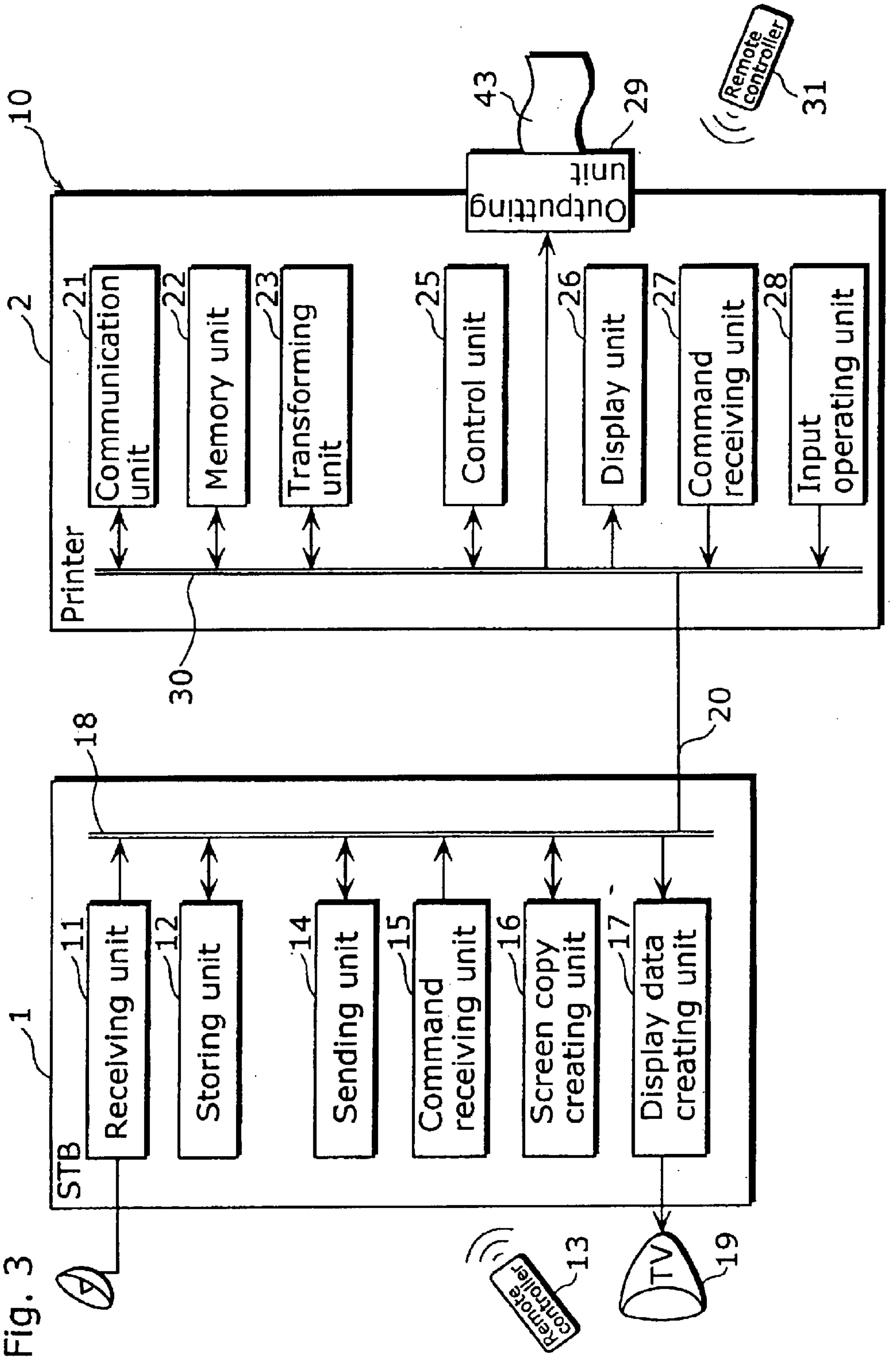
FIG. 3 is a block diagram showing a structure of a printing system 10 according to the first embodiment.

FIG. 3 is a block diagram showing a structure of a printing system 10 according to the first embodiment. The printing system 10 includes a set top box (STB) 1 and the printer 2. The STB 1 and the printer 2, which are connected with an external bus 20 such as an IEEE 1394, create hardcopies of pictures that are displayed on a TV 19 shown in FIG. 3 at a screen copy creating unit 16 in the STB 1, and capture one by one the pictures that are projected on the TV screen so as to print the projected pictures with the printer 2.

The STB 1 includes a receiving unit 11, a storing unit 12, a remote controller 13, a sending unit 14, a command receiving unit 15, the screen copy creating unit 16, a display data generating unit 17 and a bus 18. The STB 1 is connected to the external TV 19. The receiving unit 11 receives the TV broadcast so as to send contents such as received videos, music and texts to the bus 18. The storing unit 12 is a memory which is realized either with a semiconductor memory such as a hard disk or with a RAM and a detachable memory card, and the storing unit 12 stores the received contents and data that are created in the STB 1 so as to provide a working area for data processing at each processing unit such as the screen copy creating unit 16 or the like. The remote controller 13 includes an operating unit such as a push button, and outputs signals corresponding to printing commands that are directed to the STB 1, print ending commands, capture commands and channel switching commands by infra-red radiation according to the user's operations. The sending unit 14 includes the IEEE 1394 interface and sends contents that are stored in the storing unit 12 and print data that are created by the screen copy creating unit 16 to the printer 2 when the printing commands are received at the command receiving unit 15. The command receiving unit 15 receives from the remote controller 13 the printing commands for the contents that are sent from the user, the channel switching commands and the capture commands for a display screen and the like by infra-red radiation or the like. The screen copy creating unit 16 captures a picture of moving pictures and videos following the capture commands that are received at the command receiving unit 15 so as to create picture data and a printing command for printing the hardcopy of the screen. The display data generating unit 17 creates display data for displaying the data received at the receiving unit 11 on the TV 19. The bus 18 is a parallel data transmission path for sending data between each unit in the STB 1. The TV 19 is a TV monitor which is realized with a PDP (Plasma Display Panel), LCD (Liquid Crystal Display), CRT (Cathode-Ray Tube) or the like, and displays the display data on the screen that is created at the display data generating unit 17.

The printer 2 is a printer which is internally equipped with a GUI (Graphical User Interface), and the printer 2 receives directly an input of the print setting from the user so as to N-column print the hardcopy of the screen captured at the STB 1 either in a format of 2-in-1 or that of 4-in-1. The printer 2 includes a communication unit 21, a memory unit 22, a transforming unit 23, a control unit 25, a display unit 26, a command receiving unit 27, an input operating unit 28, an outputting unit 29, a bus 30, and a remote controller 31. The communication unit 21 includes the IEEE 1394 or the like and receives contents and picture data of the screen hardcopy that is sent from the STB 1 via the external bus 20. The memory unit 22 is a memory which is realized with a semiconductor memory such as a hard disk and a RAM as well as a detachable memory card or the like. The memory unit 22 is used for a storage of the contents as well as the picture data that are received at the communication unit 21 and also as a spool for the contents and the picture data, and stores the print setting that is inputted by the user. The memory unit 22 provides working areas for processing such as the reduction and rotation of picture data at the transforming unit 23.

The transforming unit 23 follows the print setting that is stored in the memory unit 22, rasterizes the contents and the picture data stored in the memory unit 22, reduces the sizes of the contents and the stored picture data and rotates them so as to transform them into print data for N screen division printing (N-column printing) such as 2-in-1 or 4-in-1. The transforming unit 23 also suspends paper forwarding at the position befitted to the N-column printing when the printer 2 is a line printer with an ink-jet method and the N-column printing is set, and creates print control data and print data befitting the position where the paper forwarding is suspended so as to output the print control data and the print data befitting the position where the paper forwarding is suspended to the outputting unit 29.

For example, when 2-in-1 printing is set, the print control data containing a temporary stop command, which suspends paper forwarding, is created so that the paper forwarding may be stopped at the position where the paper forwarding of the print sheet is half-finished, and the created print control data and the print data is outputted to the outputting unit 29 when print data which is the equivalent of a half page is created. When the printer 2 is a page printer such as a laser printer, the transforming unit 23 does not create a temporary stop command of paper forwarding. The transforming unit 23 keeps the print data after the transformation in the memory unit 22 until print data which is the equivalent of one page is completed, and if such print data is completed, outputs the print data to the outputting unit 29. For example, when only picture data that is equivalent to one screen is received in the case in which the printer 2 is set for 2-in-1 printing, the transforming unit 23 reduces or rotates the received picture data so as to create print data of the first part of a page and stands by until the next picture data is received while storing the created print data in the memory unit 22. When the next picture data is received, the transforming unit 23 reduces or rotates the received picture data so as to create picture data of the latter part of the page. The transforming unit 23 thus outputs the print data which is the equivalent of one page to the outputting unit 29 when the creation of such print data is completed.

The control unit 25 performs control of paper forwarding at the outputting unit 29 in accordance with the print control data that was created by the transforming unit 23. For example, the printing is suspended at the position of a page break and performs paper forwarding of a print sheet. Moreover, when the printer 2 is a line printer, paper forwarding is suspended at the position where print stopping commands are received. The display unit 26 creates an input screen for performing a print setting or the like with GUI, which is internally equipped so as to display the print setting on the liquid crystal display panel that is included in the main body of the printer 2. The command receiving unit 27 receives the infra-red radiation sent from the remote controller 31 so as to input instructions regarding the items to be selected at the print setting screen. The input operating unit 28 is a push button that is included in the main body of the printer 2 or the like, and the input operating unit 28 outputs the signals corresponding to the shifting cursor and the final selections on the input screen of the print setting that is displayed on the display unit 26. The outputting unit 29 prints the picture displayed with the print data that is created by the transforming unit 23, and a 2-in-1 printout of the hardcopy of the picture is displayed on the screen of the TV 19. The bus 30 is a parallel data transmission path for sending data between each unit in the printer 2. The remote controller 31 includes a push button or the like and outputs the infra-red signals corresponding to the cursor shifting and the final selections according to the user's operations on the input screen such as a print setting.

Figure 4:
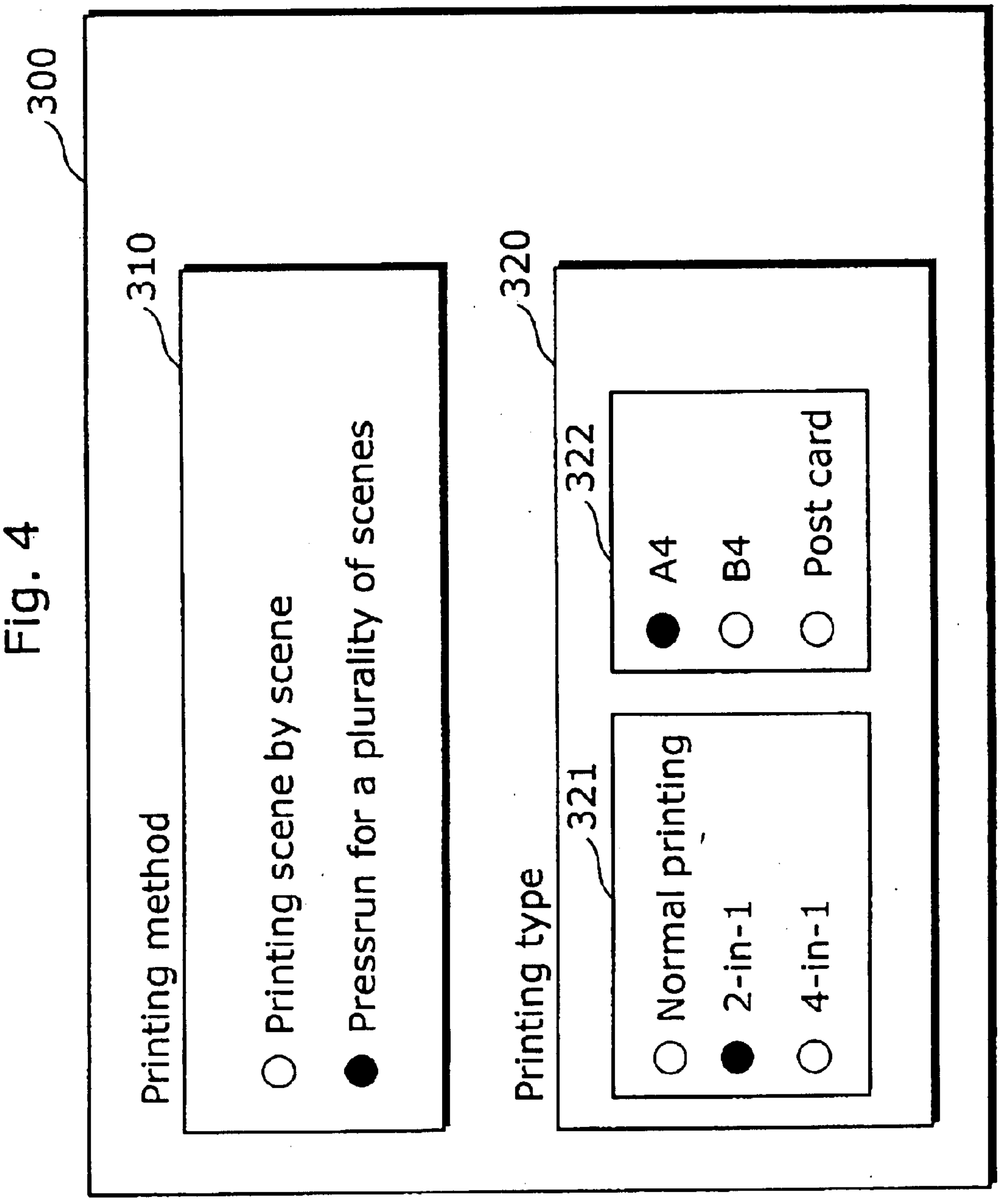
FIG. 4 is a diagram showing an example of an input screen for a print setting at the printer 2 shown in FIG. 3.

The operation of the printer 2 as constructed above is explained with reference to FIGS. 4 and 5. FIG. 4 is a diagram showing an example of the input screen for a print setting at the printer 2 shown in FIG. 3. A print setting screen 300 of the printer 2 contains at least an input frame 310 for determining a printing method of the printer 2, and an input frame 320 for determining a print type. For example, when each scene of the pictures on the TV 19 is captured and printed, options are prepared in the input frame 310 for determining the printing method to select either printing by performing a print setting for each captured scene or printing a plurality of scenes sequentially under the same print setting. Also, the input frame 320 for determining the print type of the printer 2 further includes an input frame 321 regarding the N-column printing and an input frame 322 regarding the size of print sheets. in the input frame 321, an option is set in order to select either a normal printing for printing picture data of one screen to a print sheet without modification, a 2-in-1 printing which reduces picture data of two screens so as to print respectively on the first half and the latter half of a print sheet (2 pages/sheet), and a 4-in-1 printing which reduces picture data of four screens so as to print at each part of the first half and the latter half of a sheet further divided into two in a transverse direction (4 pages/sheet). Also, in the input frame 322, options are prepared for selecting either "A4","B4" and "post card" as a size of the print sheets. White and black circles at the head of each option on the print setting screen 300 in FIG. 4 are selecting marks for showing whether each option is selected or not, and the black circles show that the relevant options are selected. For example, when the user operates either the input operating unit 28 that is included in the main body of the printer 2 or the cursor keys 33 of the remote controller 31, the black circles shift sequentially among the selectable options in the input frame to where the position of the black circles is active. Then, if the user presses the select key 34 after that, the presently selected option shown with the black circle is determined. Consequently, the user operates the cursor keys or the like so as to select the desired option and then presses the select key 34 (plus the sending key 35 in case of remote controller 31) so as to input the desired print setting.

Figure 5:
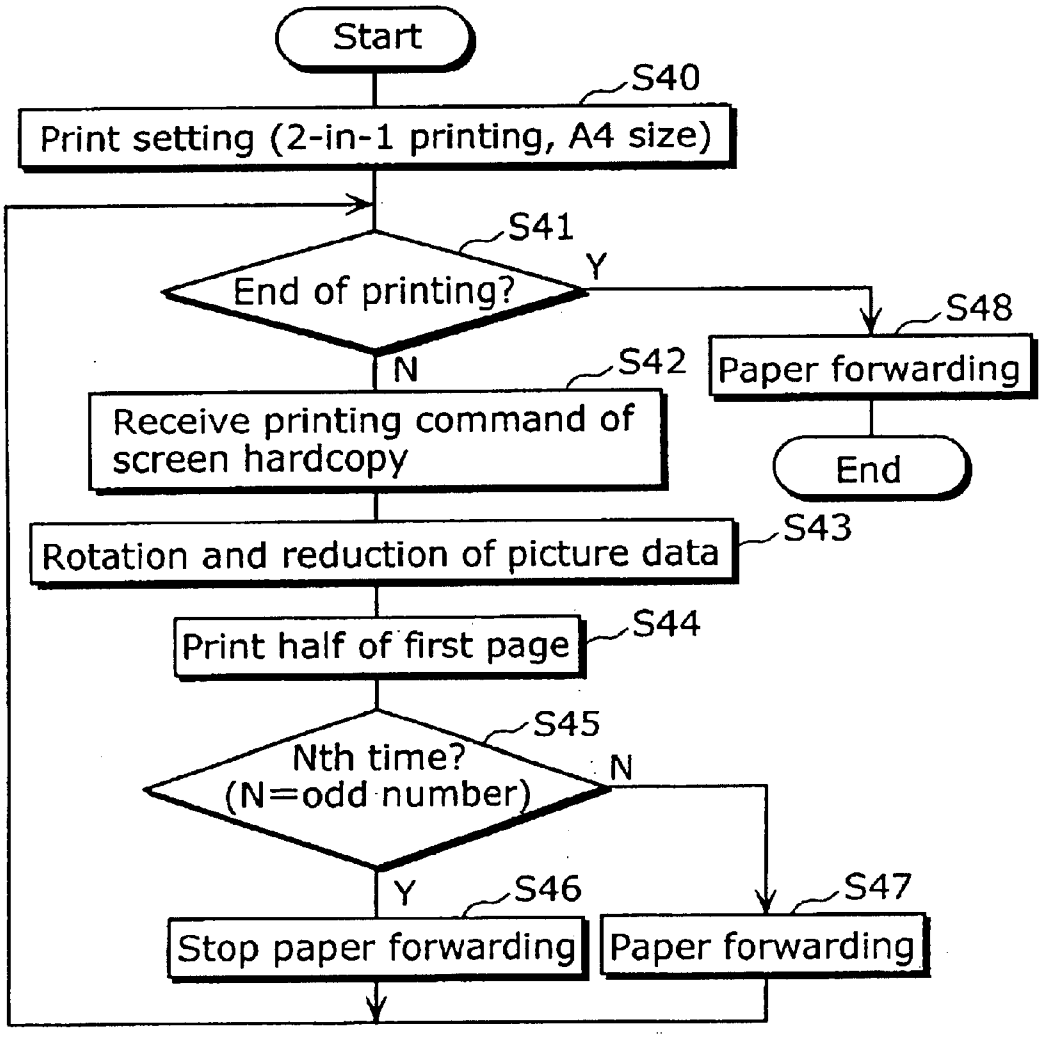
FIG. 5 is a flowchart showing an operation of 2-in-1 printing when the printer 2 shown in FIG. 3 is a line printer.
Figure 6A:
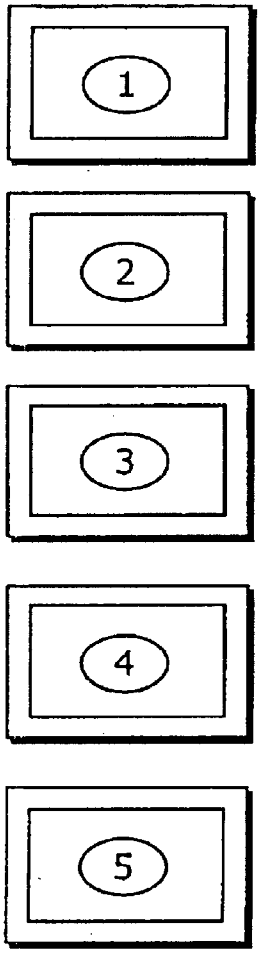
FIG. 6A is a diagram showing pictures which are subsequently captured from video that is displayed on a TV 19.
Figure 6B:
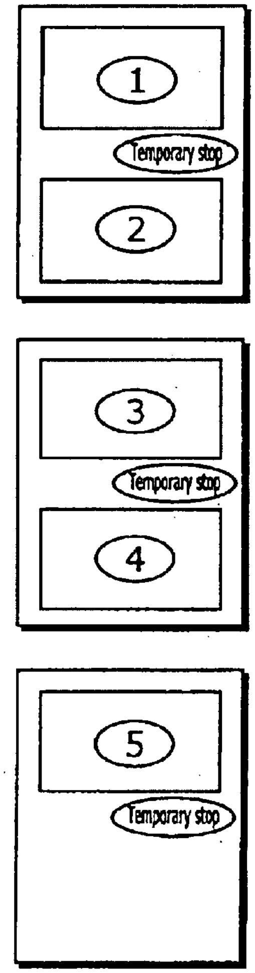
FIG. 6B is a diagram showing an example of printing pictures when the printer 2 according to the first embodiment performs 2-in-1 printing for the pictures shown in FIG. 6A.

FIG. 5 is a flowchart showing an operation of the 2-in-1 printing when the printer 2 shown in FIG. 3 is a line printer. FIG. 6A is a diagram showing pictures which are captured in turn from video that is displayed on the TV 19. FIG. 6B is a diagram showing an example of print pictures when the printer 2 of the first embodiment prints the pictures shown in FIG. 6A with 2-in-1 printing. The following explains a case in which it is set that the user captures continuously a plurality of the scenes shown in FIG. 6A at the print setting screen 300 shown in FIG. 4 and prints the scenes 2-in-1 on A4 sheets. As a starting point, the user inputs a print setting at the print setting screen 300 of the printer 2 (S40). Then, the user operates the remote controller 13 of the STB 1 with an appropriate timing while looking at the screen that is displayed on the TV 19 and presses, for instance, a capture button. The STB 1, receiving a capture command at the command receiving unit 15, captures the pictures that are displayed on the TV 19 at the screen copy creating unit 17 so as to create the picture data ① and a printing command corresponding to the picture data ①. The sending unit 14 sends the created picture data ② and the printing command to the printer 2. The printer 2 receives the created picture data ① and the printing command at the communication unit 21 (S42) and reduces or rotates the received picture data ① at the transforming unit 23 so as to create the print data to be placed at the first part of the print sheet (S43) unless a print ending command is issued until then (S41). The printer 2 prints the first half of the first print sheet at the first printing command (S44) and suspends paper forwarding at the halfway position of the first print sheet (S46) since the printing command is issued for the Nth number of times (N is presently an odd number) (S45). The printer 2 prints the latter part of the first print sheet (S43 and S44, FIG. 6B) upon receiving the second printing command and the picture data ② (S 42), and forwards the first print sheet (S47) since the printing command is issued for the Nth number of times (N is presently an even number) (S45). Here, when the print ending command is not issued (S41) and the printer 2 receives the third printing command and the picture data ③ (S42), the printer 2 prints the first half of the second print sheet (S43, S44) and suspends paper forwarding at the halfway position of the second print sheet (S46) since the printing command is issued for the Nth number of times (N is presently an odd number) (S45). The printer 2 prints the latter part of the second print sheet (S43 and S44, FIG. 6B) upon receiving the fourth printing command and the picture data ④ (S42), and forwards the second sheet (S47) since the printing command is issued for the Nth number of times (N is presently an even number) (S45). Upon continuously receiving the fifth printing command and the created picture data ⑤ (S42), the printer 2 prints the first part of the third print sheet (S43, S44), whereas when the print ending command is issued (S41) at the position where the paper forwarding is suspended since the printing command is issued for the Nth number of times (where N would be an odd number) (S46), the printer 2 forwards the third sheet with the blank space in the latter part so as to end the successive printing of the plurality of scenes. In this way, the picture data ①–⑤ of the five scenes can be printed on three print sheets as shown in FIG. 6B.

Figure 6C:
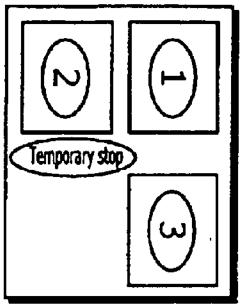
FIG. 6C is a diagram showing an example of printing pictures when the printer 2 according to the first embodiment performs 4-in-1 printing for the pictures shown in FIG. 6A.
Figure 7:
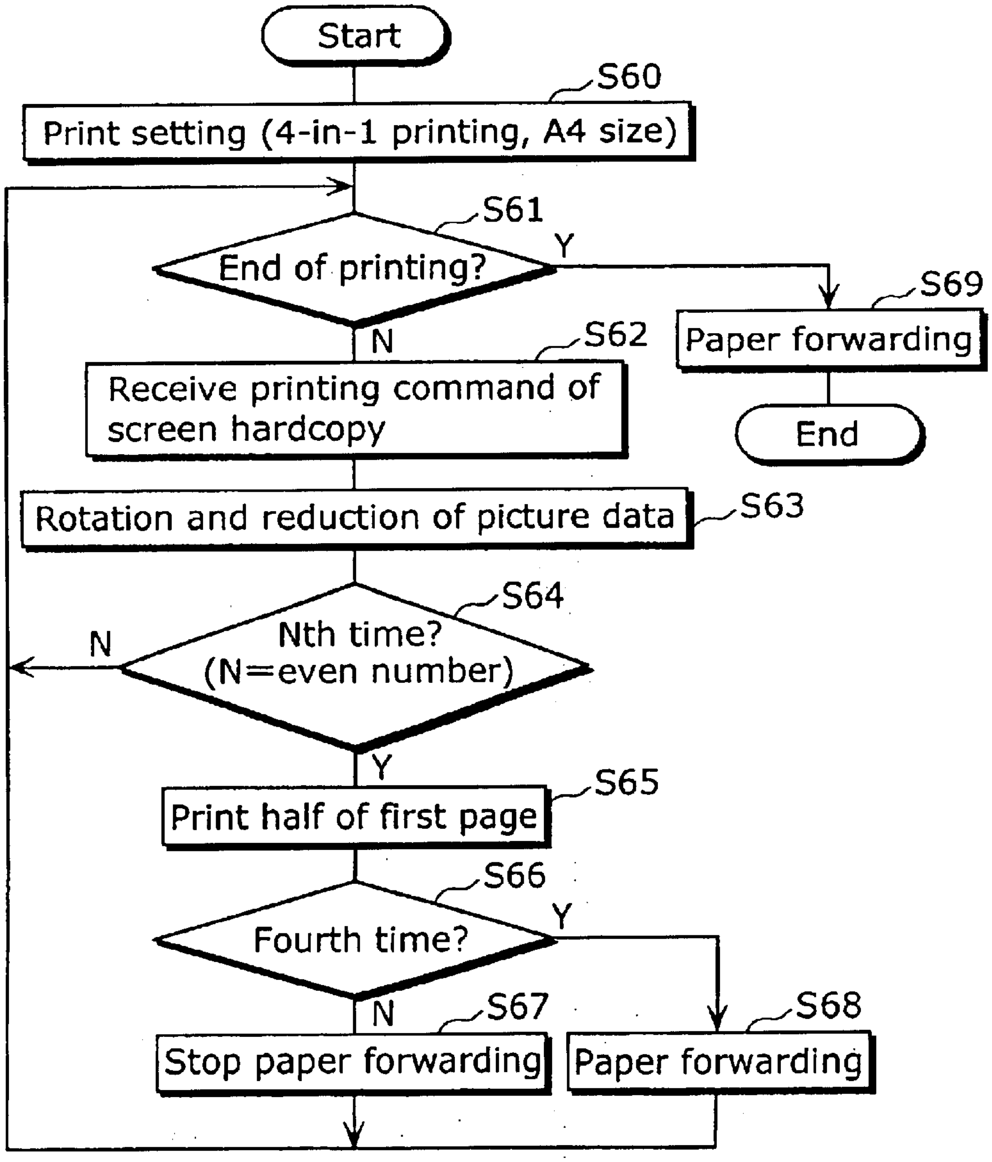
FIG. 7 is a flowchart showing an operation of 4-in-1 printing at the printer 2 shown in FIG. 3.

FIG. 7 is a flowchart showing an operation of 4-in-1 printing at the printer 2 shown in FIG. 3. FIG. 6C is a diagram showing an example of the print pictures when the printer 2 of the first embodiment prints the pictures shown in FIG. 6A with 4-in-1 printing. When the user selects the 4-in-1 printing setting (S60), the printer 2 receives the picture data ① and the first printing command from the STB 1 (S62) unless the print ending command is issued (S61) as in the case of 2-in-1 printing. Moreover, the printer 2 reduces and rotates the received picture data ①, if necessary, at the transforming unit 23 so as to place the picture data ① on the determined printing position, and the printer 2 creates print data for 4-in-1 printing (S63). Since the first printing command is issued for the Nth number of times (N is presently an odd number) (S64), the printer 2 waits for the next picture data ② and the second printing command, receives the second picture data ② and the second printing command at the communication unit 21 (S62), unless the print ending command is issued while waiting (S61) so as to create the print data for 4-in-1 printing at the transforming unit 23 (S63). When the picture data ① corresponding to the first printing command and the picture data ② corresponding to the second printing command are composed (scaling and rotation processing) so as to be located in the respective printing positions on the first part of the printing sheet, the outputting unit 29 prints the created print data on the first part of the first print sheet (FIG. 6C) since the printing command is issued for the Nth number of times (N is presently an even number) (S64). in this case, since the printing command is not the fourth printing command (S66), the printer 2 suspends forwarding the print sheet (S67) and waits until the next printing command and the picture data ③ corresponding to the next printing command are received. When the ending command is issued after the third printing command and the picture data ③ are received (S62), the print ending command is detected (S61), and the print sheet is forwarded (S69) after picture data of the third printing command is printed on the latter part of the first sheet (S63-67). Consequently, the user can make sure that the hardcopy of the screen that is captured by each capture command is printed without fail and can also print while confirming how much blank space the user can save. As for the creation of the print data that is operated by the first and the second printing commands for the 4-in-1 print setting, the picture data corresponding to the first printing command may be stored in the memory unit 22 so that composing processing (scaling and rotation) of the print data is performed at the time when the second picture data is received.

As for the case in which rotation and scaling processing of the pictures are needed, there are four cases: when the STB 1 performs both of the processing; when the printer 2 performs both of the processing; when the STB 1 performs the scale processing of pictures whereas the printer 2 performs the rotation processing of the scale processed data; when the STB 1 performs rotation processing whereas the printer 2 performs scale processing of the rotation processed data. The particular case for rotation and scaling processing may be selected according to the hardware configurations of the STB 1 and the printer 2. For example, if the STB 1 originally includes the function to perform scale processing for the pictures, an effective utilization of the hardware is realized when the printer 2 is made to include the function of rotation processing.

Figure 8:
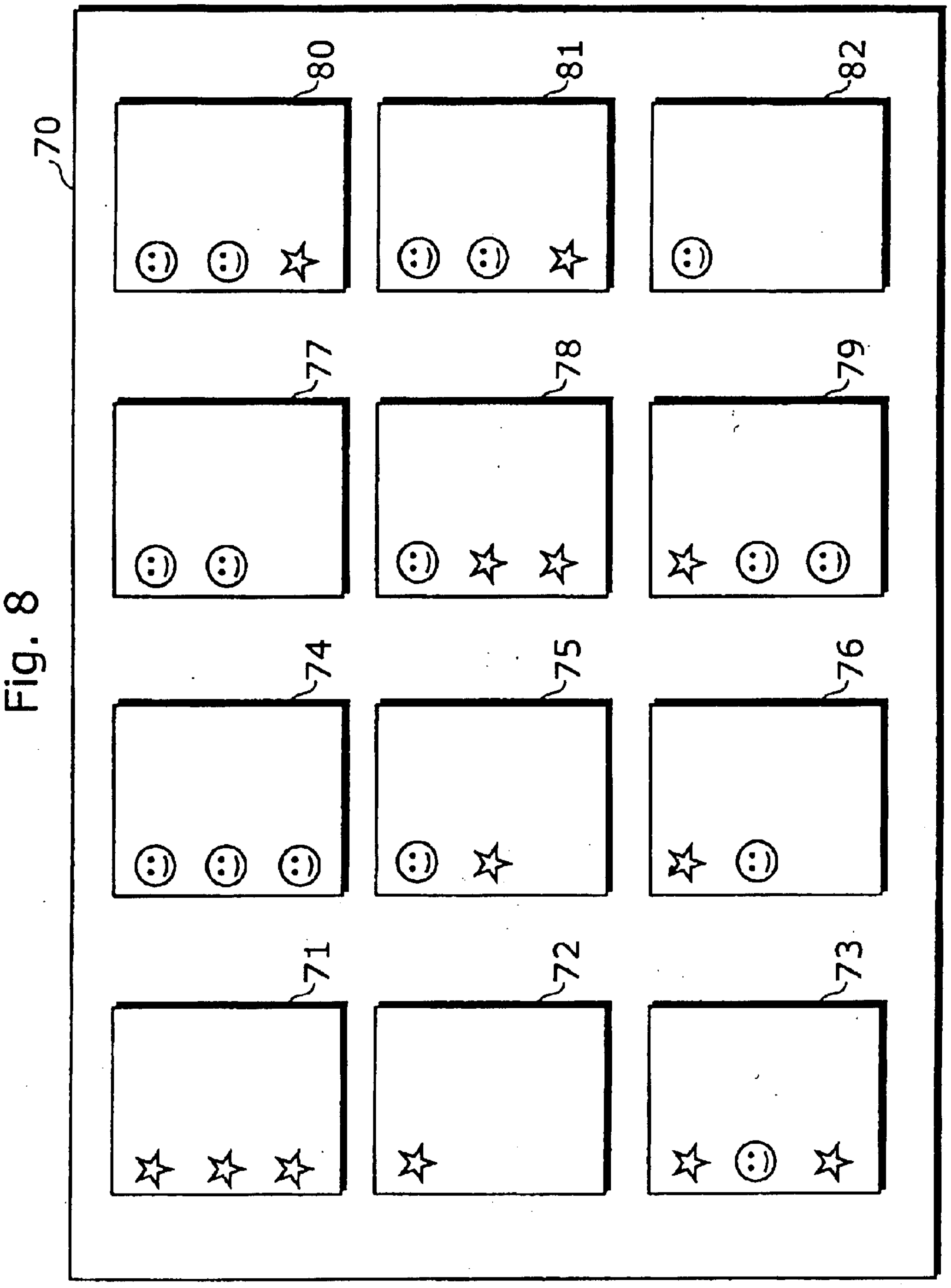
FIG. 8 is a diagram showing an example of a screen 70 on the TV 19 in which a plurality of pictures are displayed.

The processing is not limited to capturing moving pictures or videos, and the same processing can be applied to a case of printing one by one a plurality of pictures that are displayed on one screen. FIG. 8 is a diagram showing an example of a screen 70 on the TV 19 where a plurality of pictures 71–82 are displayed. When the plurality of the pictures 71–82 are displayed on the screen 70 as shown in FIG. 8, it is possible to print each picture that is displayed on the screen 70. in this case, the user selects the pictures that he/she wants to print from among the plurality of the pictures that are displayed on the screen 70 and presses the print button or the like by operating the remote controller 13 or the like. In this way, picture data of the selected display pictures is sent to the printer 2 together with the respective printing commands. For example, when the user selects a picture 71 on the screen 70 and presses the print button under the setting of 2-in-1 printing for a plurality of pictures at the printer 2, the first printing command and the picture data ① representing the picture 71 are sent to the printer 2. The printer 2, upon the receipt of the first printing command and the picture data ① prints the picture 71 on the first part of the first print sheet and suspends paper forwarding of the print sheet. Then, when a picture 73 is selected on the screen 70 and the print button is pressed, the second printing command and the picture data ② representing the picture 73 are sent to the printer 2. The printer 2, upon the receipt of the second printing command and the picture data ② prints the received picture data ② on the latter half of the first print sheet and forwards the print sheet. Thus, the printer 2 can 2-in-1 print the selected pictures one by one. In the same way, a plurality of pictures can be printed in succession in the case of 4-in-1 printing.

The above example has explained the case in which the printer 2 is a line printer; however, in a case where the printer 2 is a page printer like a laser printer, the printer 2 cannot print halfway through the first print sheet and suspend paper forwarding so as to print subsequently selected images. Therefore, when printing 2-in-1 in the case where the printer 2 is a page printer, the printer 2 stores the first picture data in the memory unit 22 and waits until the receipt of the second printing command and the corresponding picture data is completed. Next, the printer 2 creates print data that is the equivalent of one print sheet as shown in FIG. 6B at the stage of completing the receipt of the second printing command and the second picture data. As for the 4-in-1 printing, the printer 2 stores from the first to the third picture data in the memory unit 22, waits until the receipt of the fourth printing command and the fourth picture data is completed, and creates print that is the equivalent of one print sheet at the stage of completing the receipt of the fourth printing command and the fourth picture data.

The above-described example has explained that a printing command of each picture is created at the STB in pair with the picture data and is sent to the printer 2. The present invention, however, is not restricted thereto. For example, when the printer 2 is set to print a plurality of pictures successively, the STB 1 sends only one printing command whereas the printer 2 may print in succession, under the same setting, a plurality of picture data which is received following the printing command. In this case, the printer 2 may determine whether picture data which is equivalent to one print sheet is received or not by counting the number of picture data that is (are) received from the STB 1 at the Step S45 in the flowchart shown in FIG. 5 as well as at the Steps S64 and S66 shown in FIG. 7. The same applies to the case in which the printer 2 is a page printer, where the printer 2 may determine whether picture data which is equivalent to one print sheet is received or not by counting the number of received pictures.

Also, in the above example, a print sheet is forwarded according to the print ending command sent from the STB 1, whereupon the printing ends. The present invention, however, is not limited thereto. For example, the printer 2 may print without pauses when there is the next picture data to be printed and release the temporary stop of paper forwarding so as to forward the print sheet and end printing when the next picture data is not found. In this case, as for the determination of whether the next picture data for pressrun is found or not, in the case in which the printer 2 is a line printer, a timer is included in the control unit 25 so as to measure the elapsed time for receiving the next picture data after receiving an earlier sent picture. When the next picture data is not received within a certain time of 30 seconds–3 minutes, for example, it is judged that the next picture data is not found. On the other hand, in the case in which the printer 2 is a page printer, the printer 2 determines that the next picture data to be printed exists when even a part of the next picture data is stored in a receiving buffer of the printer 2, and the printer 2 determines that the next picture data does not exist when the receiving buffer is empty.

Second Embodiment

Figure 9:
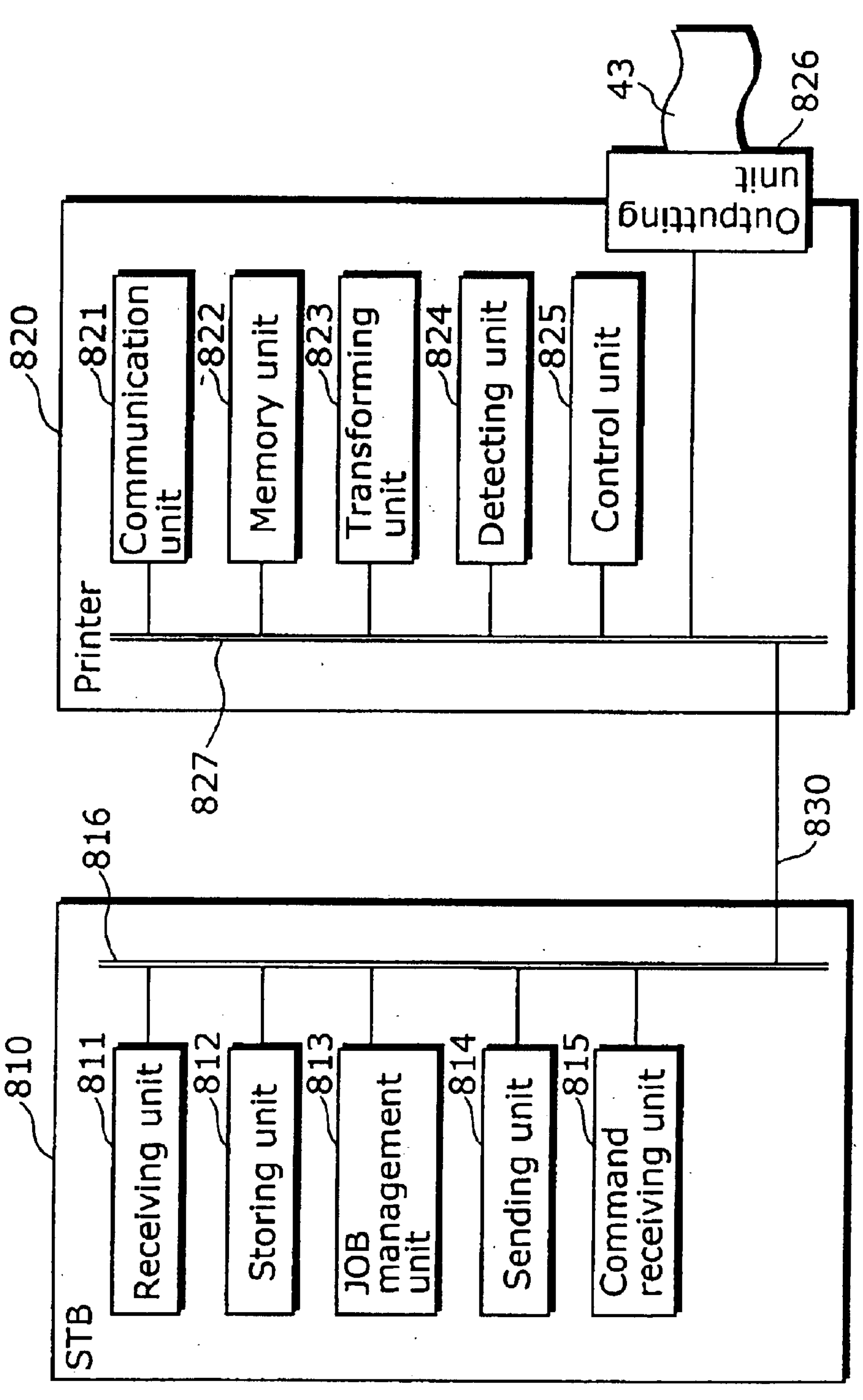
FIG. 9 is a block diagram showing a structure of a printing system 800 according to a second embodiment of the present invention.

In the first embodiment as described above, the printer 2 equipped with a user interface function performs N-column printing of the screen hardcopy by receiving directly an input of a print setting from the user. A second embodiment of the present invention, however, differs from the first embodiment in that the print setting is set exterior to the printer (by a STB 810 or the like). FIG. 9 is a block diagram showing a structure of a printing system 800 according to the second embodiment. The printing system 800 is a system which prints contents such as recipes that are received by a digital broadcast and which prints continuously so that the blank space that can be produced during printing may become smaller. The printing system 800 consists of a STB 810 which receives a digital TV broadcast and a printer 820 which prints the contents that are received by the STB 810. A bus 816 in the STB 810 and a bus 827 in the printer 820 are connected by an external bus 830 such as an IEEE 1394 or the like.

The STB 810 includes a receiving unit 811, a storing unit 812, a JOB management unit 813, a sending unit 814 and a command receiving unit 815. The receiving unit 811 receives contents from outside sources, for example, by receiving a TV broadcast. The storing unit 812 stores a received content 1000. The JOB management unit 813 reads out the received content from the storing unit 812 and sends the received content to the printer 820 upon receiving a printing command of the received content. Also, the JOB management unit 813 creates job information that is print setting information of the printer 820 which is specified by the user or a content creator, and manages the print setting information. The sending unit 814 sends the received content or job information to the printer 820. The command receiving unit 815 receives a printing command for the content from the remote controller, which is not shown in FIG. 9, operated by the user.

The printer 820 includes a communication unit 821, a memory unit 822, a transforming unit 823, a detecting unit 824, a control unit 825, an outputting unit 826, and a bus 827. The communication unit 821 receives job information and contents that are sent from the STB 810. The storing unit 822 stores the contents that are received at the communication unit 821. The transforming unit 823 creates print control data according to the contents and job information that are stored in the storing unit 822. The detecting unit 824 detects if a temporary stop command is found in the print control data that is created at the transforming unit 823. The controlling unit 825 performs a control of paper forwarding, such as a temporary stop of paper forwarding, when printing. The outputting unit 826 outputs image data obtained by the print control data to a sheet 43 for each band. When job information contains information indicating that a temporary stop command is valid, print control data containing the temporary stop command of paper forwarding is created.

FIG. 10 is a diagram showing an example of job information 930–932 that are created by the JOB management 813 shown in FIG. 9. The job information 930–932 are created by the JOB management unit 813 in the STB 810 for each print job, and the job information contain information for specifying a print job (job ID), information pertaining to places for storing the content to be printed with the print job (path (URI: uniform resource identifier)), a printing status of the printer 820, and a print setting. The STB 810 of the present invention further creates information to show the validity of the temporary stop command of paper forwarding that is directed to the printer 820 in the job information at the JOB management unit 813. This information shows whether a pressrun is selected in the print setting.

Figure 11A:
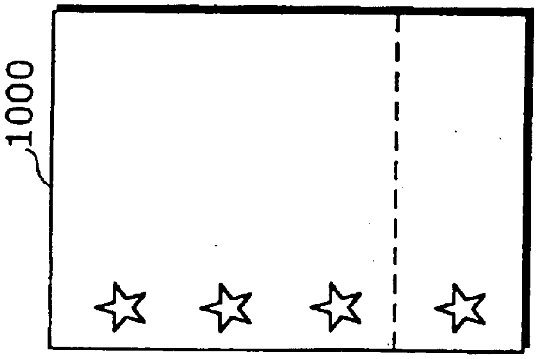
FIG. 11A is a diagram showing a content 1000 which is an example of a content that is received by a set top box (STB) 810.
Figure 11B:
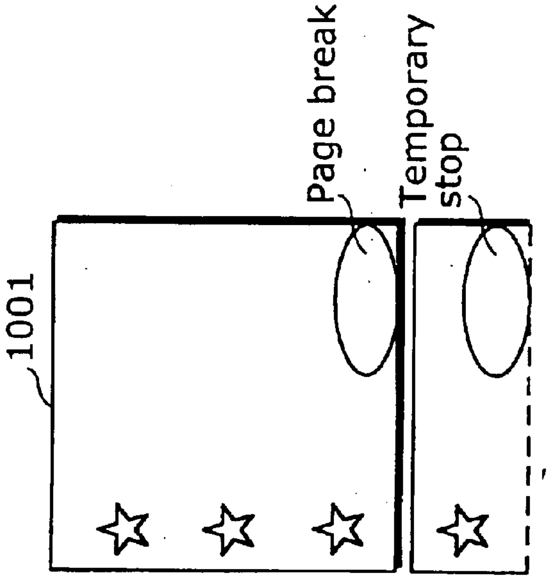
FIG. 11B is a diagram showing an example of print control data 1001 when printing the content shown in FIG. 11A with a printer 820.
Figure 11C:
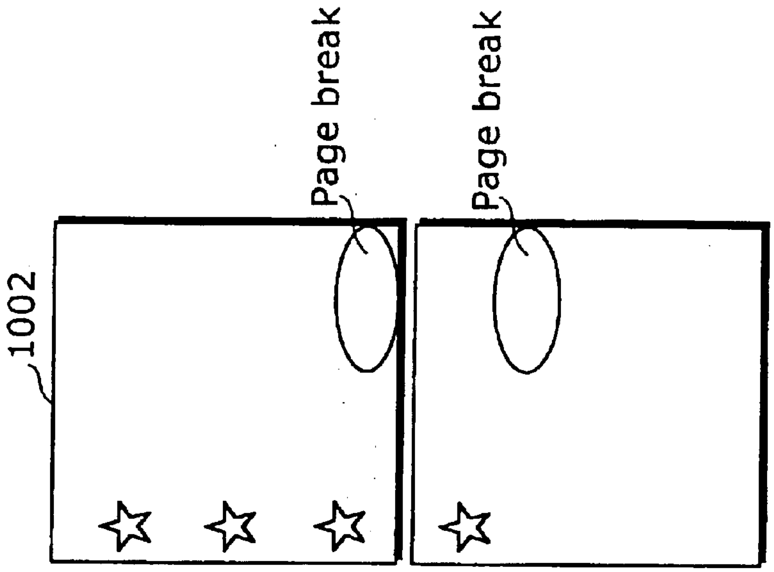
FIG. 11C is a diagram showing an example of print control data 1002 when printing the content 1000 shown in FIG. 11A with a conventional printer.
Figure 12A:
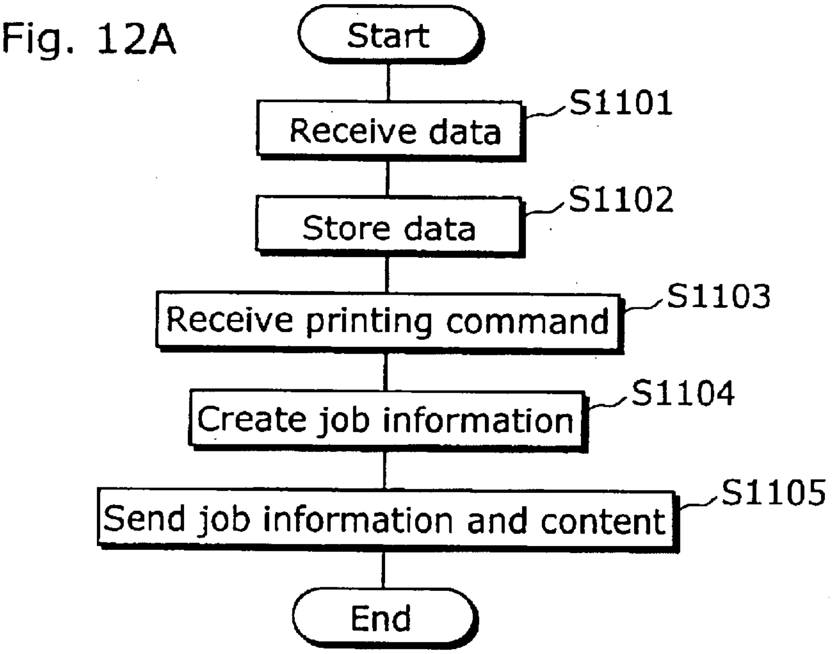
FIG. 12A is a flowchart showing an operation of the STB 810 for content print processing according to the second embodiment.
Figure 12B:
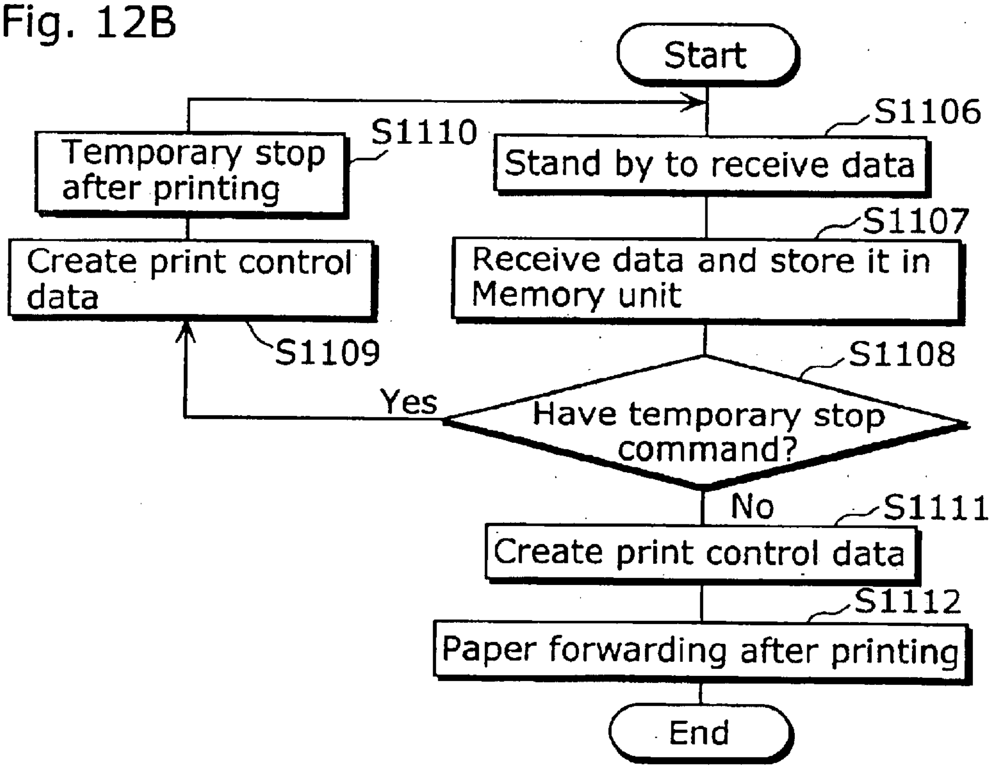
FIG. 12B is a flowchart showing an operation of the printer 820 for content print processing according to the second embodiment.
Figure 13:
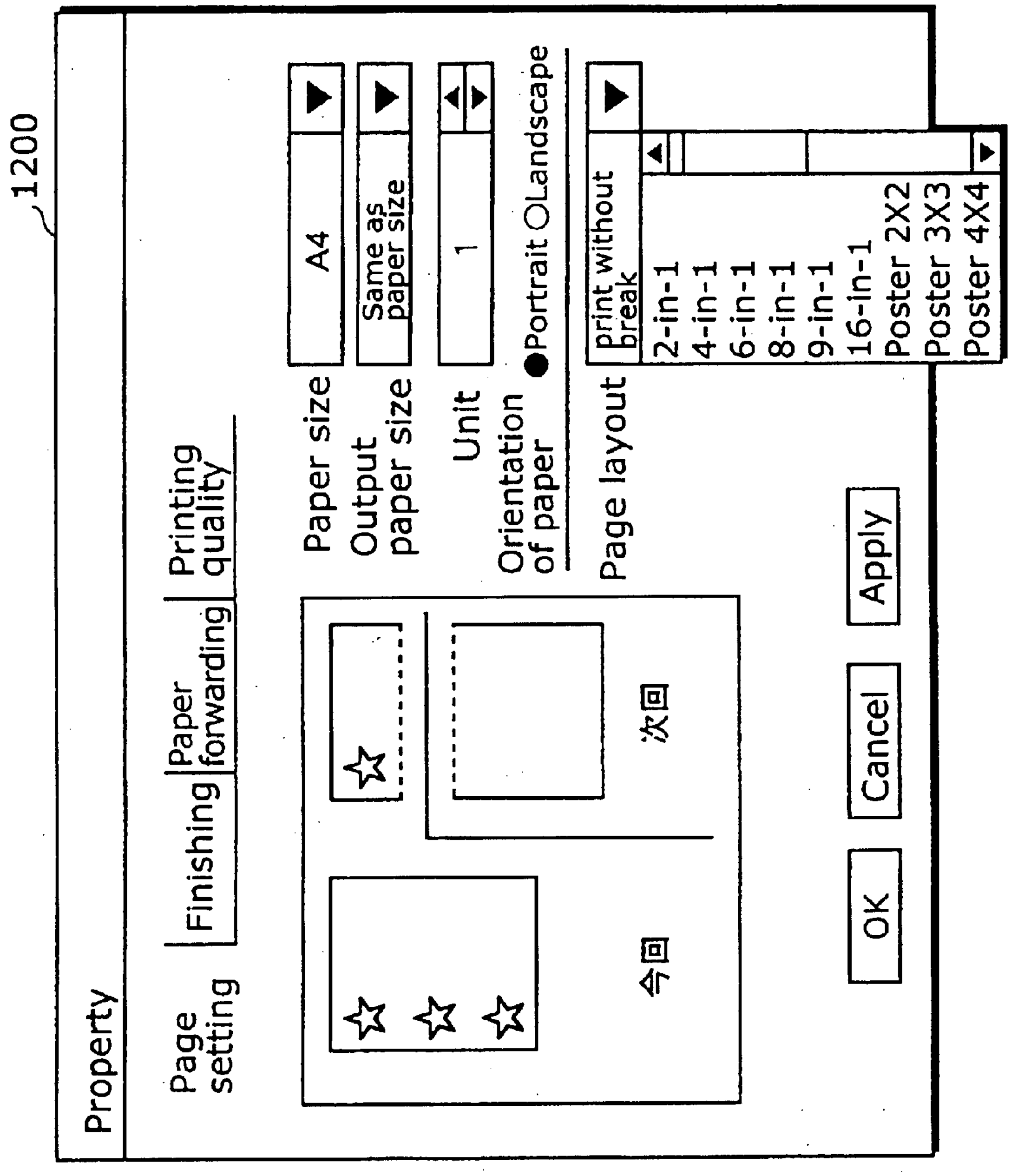
FIG. 13 is a diagram showing an example of a screen for a print setting in the printing system 800 shown in FIG. 9.
Figure 14:
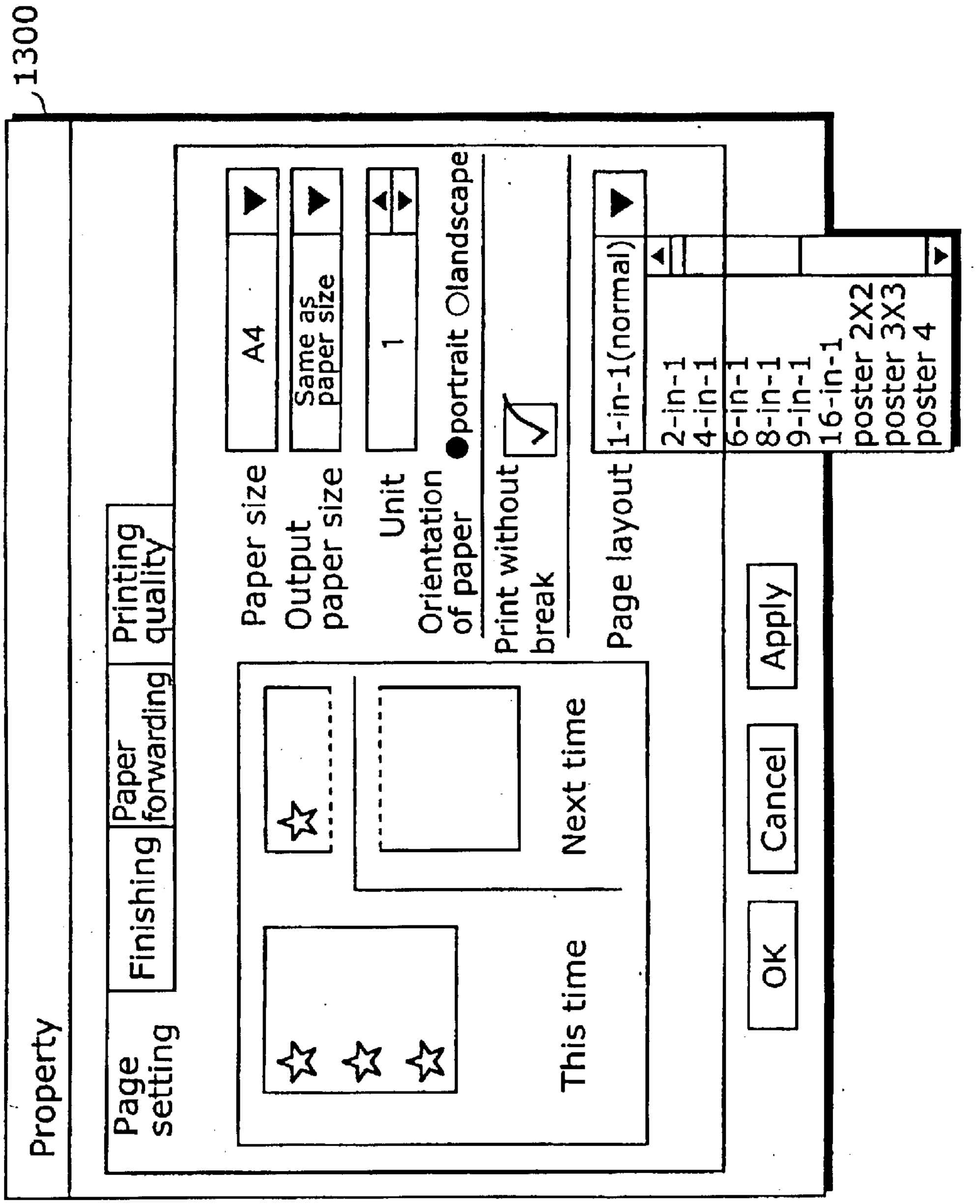
FIG. 14 is a diagram showing another example of the print setting screen in the printing system 800 shown in FIG. 9.

FIG. 11A is a diagram showing a content 1000 which is an example of the content that is received by the STB 810. FIG. 11B is a diagram showing an example of print control data 1001 when printing the content shown in FIG. 11A with the printer 820. FIG. 11C is a diagram showing an example of print control data 1002 when printing the content 1000 shown in FIG. 11A with a conventional printer. The print control data is data that is described with control language like PCL (Printer Control Language). The following describes the procedure of receiving commands of a pressrun for the content 1000 shown in FIG. 11A that is received at the receiving unit 811 in the STB 810 from the user at the command receiving unit 815, and, with reference to FIGS. 11A–14, the operations of printing with the printer 820. FIG. 12A is a flowchart showing an operation of the STB 810 at the content print processing of the second embodiment. FIG. 12B is a flowchart showing an operation of the printer 820 at the content print processing of the second embodiment. FIG. 13 is a diagram showing an example of a print setting screen under the printing system 800 shown in FIG. 9. FIG. 14 is a diagram showing another example of the print setting screen under the printing system 800 shown in FIG. 9. The user, for example, operates the remote controller, which is not shown in FIG. 9, so as to perform a print setting while looking at the print setting screen that is displayed on the TV, which is also not shown in FIG. 9. For instance, the user selects "printing without break" from items of a page layout that is set up at the lower right part of the print setting screen 1200 shown in FIG. 13. Such a screen for performing print setting is not limited to the print setting screen 1200 shown in FIG. 13, and a check box of "printing without break" may be set up separately from items of a page layout as shown in the lower right part of the print setting screen 1300 shown in FIG. 14. The content 1000 is received at the receiving unit 811 in the STB 810 (S1101) and is stored in the storing unit 812 (S1002). The STB 810 creates job information 930 to be sent to the printer 820 together with a printing command (S1104) when the printing command containing a temporary stop command of paper forwarding is received at the command receiving unit 815 when printing (S1103) according to the user's input to the print setting screen 1200 shown in FIG. 13 or the print setting screen 1300 shown in FIG. 14. Here, the temporary stop command of paper forwarding when printing is a command to suspend paper forwarding after printing the part which has data when the printing produces blank space after the completion of this printing (one print job) so as to continue printing from this blank space. When the following commands are received from the user: unit of printing is 1; printing method is one-side printing; printing quality is black and white; paper size is A4; and temporary stop is valid, the job information 930 shown in FIG. 10 is created. The created Job information 930 and the content 1000 are sent to the printer 820 by the sending unit 814 (S1105).

Then, the job information 930 and the content 1000 sent from the STB 810 are received at the communication unit 821 of the printer 820 standing by for the receipt of the (S1106) and are stored in the memory unit 822 (S1107). The transforming unit 823 creates the print control 1001 shown in FIG. 11B based on the content 1000 according to the print parameter described in the received job information 930. Since it is shown that temporary stop for paper forwarding is valid in the job information 930 (S1108) as in FIG. 10, the transforming unit 823 describes a command of a page break at the end of the first page and then describes a command of a temporary stop at the end of the for the second page (the print control 1001 is actually a command stream consisting of text data, and therefore, the diagram is not visible as in FIG. 11B) in the print control data 1001 as shown in FIG. 11B (S1109). Since a command of a temporary stop is found in the print control data 1001 which describes the second page as shown in FIG. 11B, the control unit 825 does not perform but suspends paper forwarding (S1110) after the outputting unit 826 prints the second page, and the control unit 825 stands by for receiving the next data (S1106).

Here, when it is shown that a command of a temporary stop is invalid (S1108) as in the job information 932 shown in FIG. 10, the transforming unit 823 creates print control data 1002 which has no temporary stop commands as shown in FIG. 11C (S1111). in this case, even without the data to be printed at the lower part of the second page, a page break enters as for the first page, the page break at the second page is detected at the detecting unit 824, and paper forwarding processing is performed by the control unit 825 (S1112). However, as shown in FIG. 11B, if the command of a temporary stop comes in when the data of the second page is outputted, the command of a temporary stop is detected by the detecting unit 824, and the temporary stop of paper forwarding processing is performed by the control unit 825 (S1110).

Figure 15A:
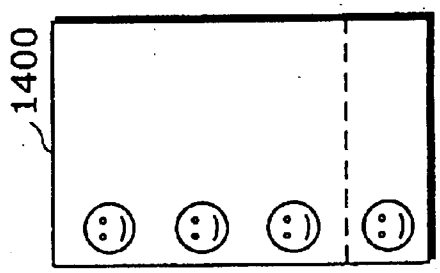
FIG. 15A is a diagram showing an example of a content 1400 printed with a job following the content 1000 shown in FIG. 11A.
Figure 15B:
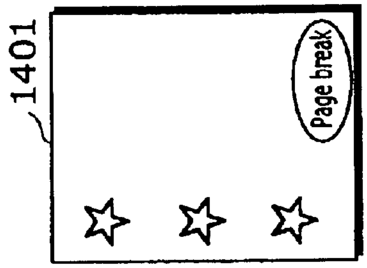
FIG. 15B is a diagram showing print control data 1401 for printing the first page of the content 1000.
Figure 15C:
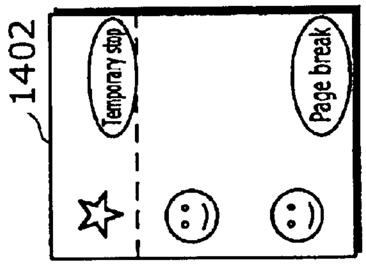
FIGS. 15C and 15D are diagrams showing print control data 1402 and 1403 for printing the content 1400 following a printing of the second page of the content 1000 shown in FIG. 11A.
Figure 15D:
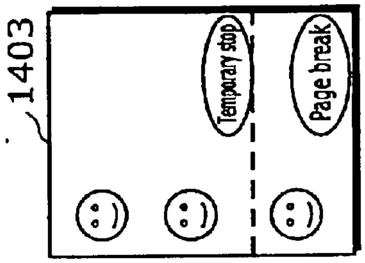
Figure 15E:
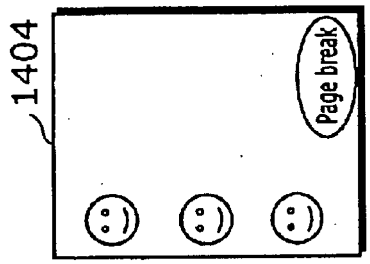
FIGS. 15E–15G are diagrams showing print control data 1404–1406 when printing two units of a pressrun for the content 1400 shown in FIG. 11A.
Figure 15F:
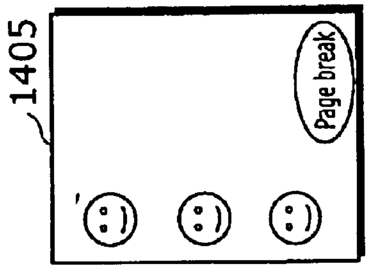
Figure 15G:
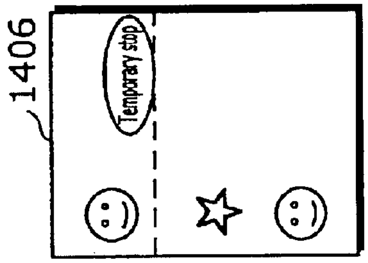
Figure 15H:
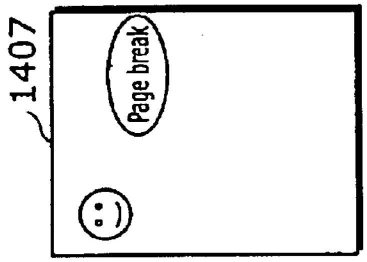
FIG. 15H is a diagram showing print control data 1407 when a page containing a temporary stop command is already stored in a memory unit 22 and is printed as the next data is received.

While the processing of Steps S1106–S1112 is performed at the printer 820, processing concerning the next print job (S1101–S1105) is carried out at the same time in the STB 810. FIG. 15A is a diagram showing an example of a content 1400 that is to be printed as the next job according to the content 1000 shown in FIG. 11A. FIG. 15B is a diagram showing print control data 1401 for printing the first page of the content 1000. FIGS. 15C and 15D are diagrams showing print control data 1402 and print control data 1403 for printing the content 1400 following the printing of the second page of the content 1000 shown in FIG. 11A. Suppose, for instance, that the job information 931 shown in FIG. 10 for printing the content 1400 shown in FIG. 15A is created at the STB 810 and sent to the printer 820 (S1101–S1105). At the printer 820, the communication unit 821 standing by to receive the next data receives the job information 931 (FIG. 10) and the content 1400, and the transforming unit 823 creates print control data 1402–1406 (S1109) pertaining to the printing of the content 1400. Here, as for the job information 931, since the temporary stop command is valid, the print control data containing the temporary stop command for printing the next content following the printing of the content 1400 is created. Also, since a printing unit shown in the job information 931 is 3, the print control data 1402–1406 aim at printing three units of the content 1400 in succession. The detecting unit 824 detects whether the print control data 1402–1406 has a temporary stop command or not. Since the detecting unit 824 does not detect any temporary stop commands up to the print control data 1406 shown in FIG. 15G, the printer 820 prints a pressrun of three units of the content 1400 continuously, i.e., without a break. Since the detecting unit 824 stands by for the next printing after that (S1106) if a temporary stop command is detected, the control unit 825 suspends paper forwarding (S1110). if job information in which a command of temporary stop is invalid (S1108), as in the job information 932, is received following the job information 931, the control unit 825 performs paper forwarding processing (S1112) after a printing following the page where the printing is suspended since print control data having a temporary stop command is not created (S111). The printer 820 stands by for the next job (S1106) after being suspended at Step S1110 so as to perform processing of creating print data. As for the subsequent printings, the same processing takes place as those after Step S1107.

Here, a method of creating print control data for the operation of a temporary stop is explained by showing the cases of processing the print job shown in the job information 930 and the job print shown in the job information 931. First, when the printer 820 PULLs (obtains) the content 1000 (FIG. 11A) and the content 1400 (FIG. 15A) from the storing unit 812 based on the job information 930 and the job information 931, control of the page is performed at the transforming unit 823 of the printer 820, the print control data shown in FIG. 15B is created as the first page, and the first page is outputted from the outputting unit 826. Then, the content 1000 is printed until the line of the temporary stop shown in FIG. 15C and the printer 820 waits for the next job. The printer 820 starts printing the content 1400 on the rest of the second page when a print job shown in the job information 931 is received by the communication unit 821.

Figure 16:
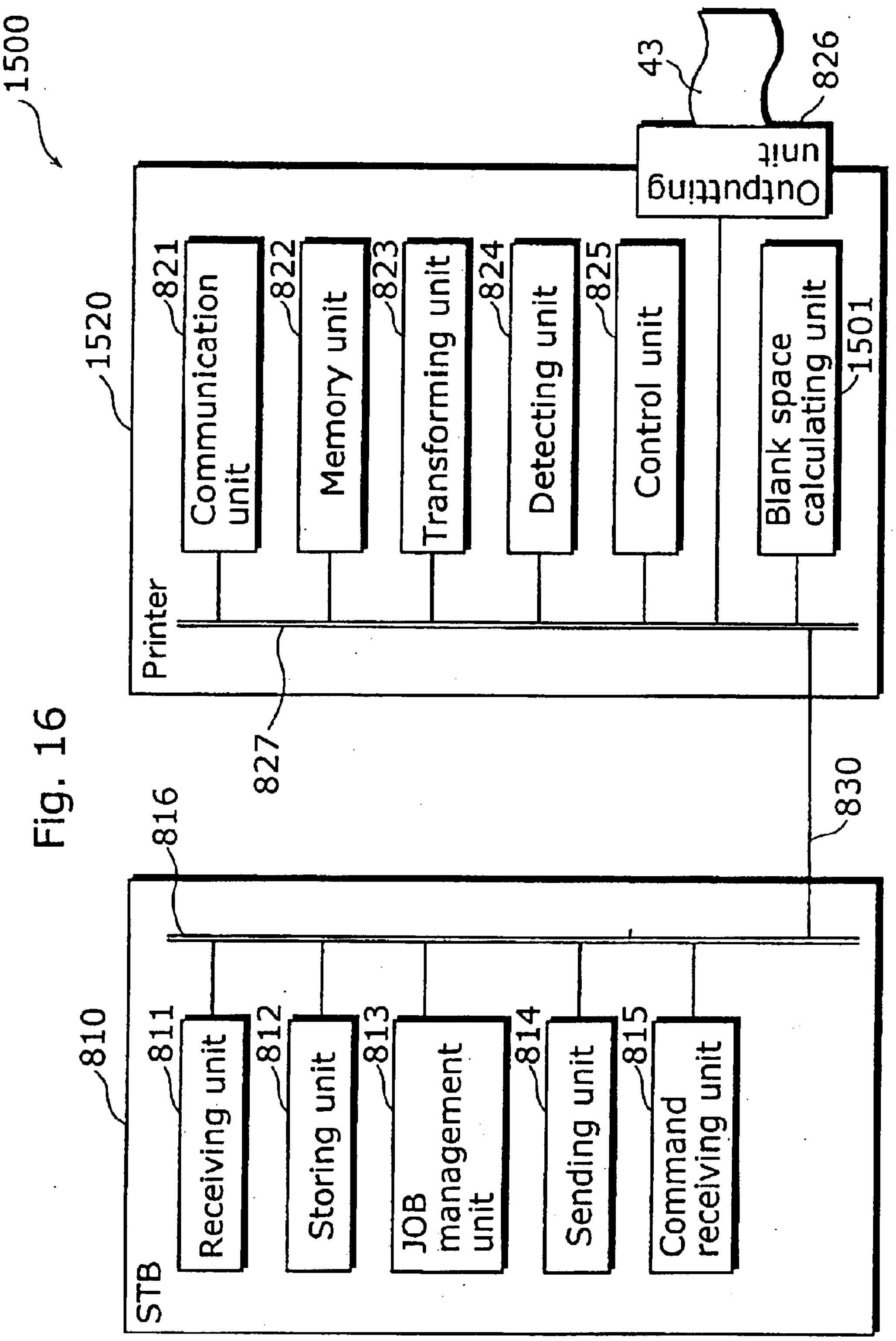
FIG. 16 is a block diagram showing a structure of a printing system 1500 included in a processing unit which calculates an amount of blank space when paper forwarding is suspended.
Figure 17:
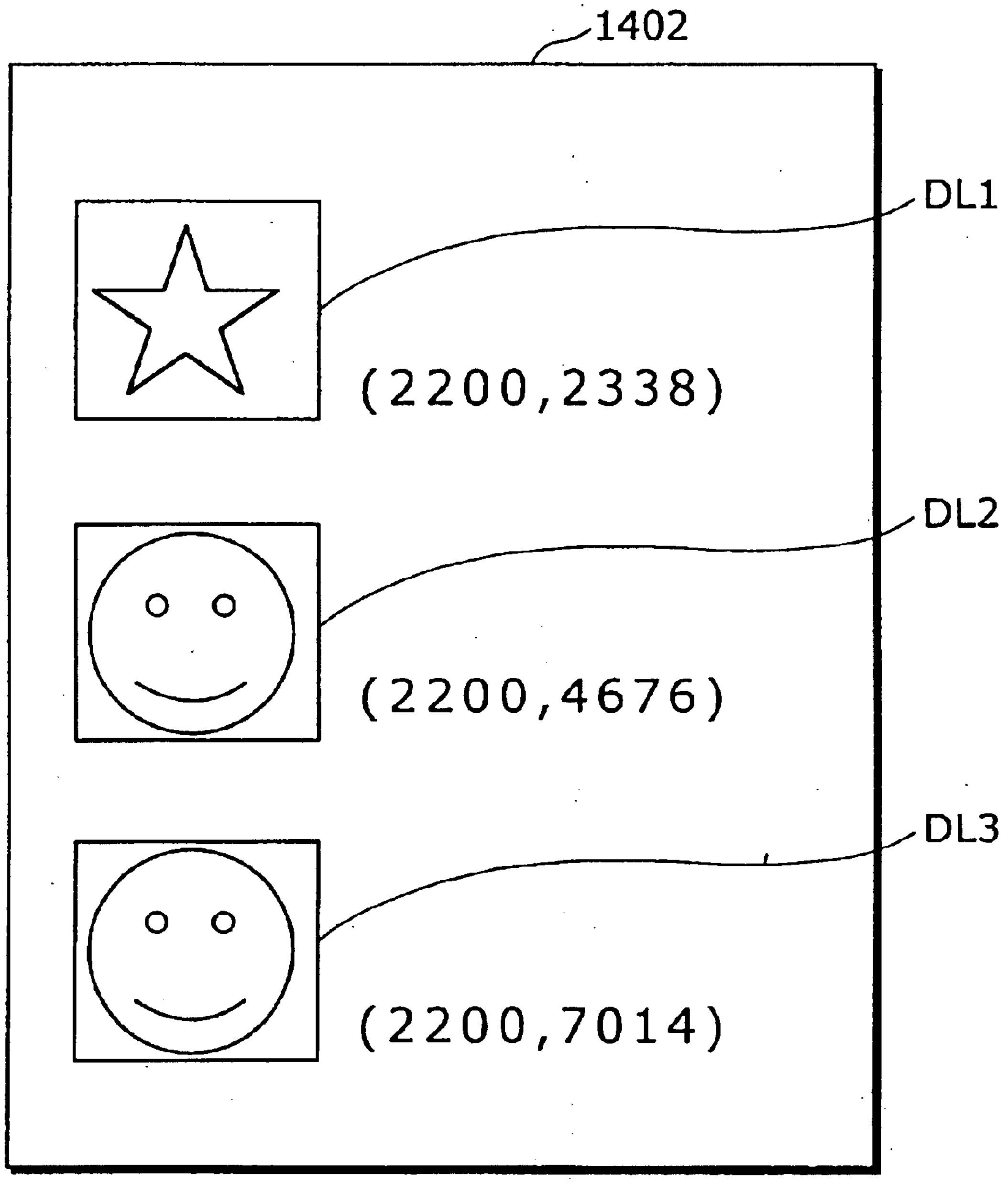
FIG. 17 is a diagram showing a model of a display list according to the present invention.

Here, FIG. 16 is a block diagram showing a structure of a printing system 1500 including a processing unit which calculates the amount of blank space in a case where paper forwarding is suspended. A printer 1520 under the printing system 1500 differs from the printer 820 shown in FIG. 8 in that a blank space calculating unit 1501 is newly included. in order to decide the range of the content 1400 to be printed on the second page of a pressrun, the blank space calculating unit 1501 shown in FIG. 16 calculates the amount of the printed part of the content 1000 on the second page of the pressrun. As for the concrete calculating method at the blank space calculating unit 1501, when the distance of the sheet that is sent until the point of a temporary stop is 99 mm and a size (distance) of the paper in the sending direction is 297 mm since the paper size in the job information 931 is A4, it is obvious that data that is equivalent to 198 mm, namely, the printing of the content 1400, is performed by using two-thirds of the paper size. As another method, "2338",which is a value of a y-axis of a DL1 (Display List) that is processed in the end at the point of a temporary stop, is obtained from the coordinate values of the DL1 that are created according to the print control data 1402 shown in FIG. 15C at the blank space calculating unit 1501, and "7014",which is the maximum value of y-axis, is obtained from the paper size. These values may be compared so as to calculate the amount of blank space. The outputting unit 826 performs printing of the content 1400 shown in FIG. 15C based on the amount of blank space thus calculated. A page break is inserted at the end of the page when the second page shown in FIG. 15C is printed and then forwarded by the control unit 825 after the printing that is performed by the outputting unit 826. As for the third page of the pressrun, a temporary stop command is detected by the detecting unit 824, and the printing of the second unit of the content 1400 is performed after paper forwarding is suspended by the control unit 825. Here, since the print job shown in the job information 931 is a printing of three units, the units may be printed continuously without the temporary stop commands shown in FIG. 15D; namely, the print control 1404 shown in FIG. 15E may be created and then printed. On the third page of the pressrun, a part of the first unit of the content 1400 and a part of the second unit of the content 1400 are printed. In the same way, on the fourth page, the print control data 1404 shown in FIG. 15E containing a part of the second unit of the content 1400 is created, and on the fifth page, the print control data 1405 shown in FIG. 15F containing a part of the third unit of the content 1400 are created. Then, on the sixth page, the print control data 1406 shown in FIG. 15G containing a part of the third unit of the content 1400 is created. Since the temporary stop command in the job information 931 is valid, paper forwarding is not performed but is suspended by the control unit 825 after the printing is performed by the outputting unit 826. The number of sheets that is necessary for the pressrun of the content 1000 and the content 1400 is thereby six.

Figure 18:
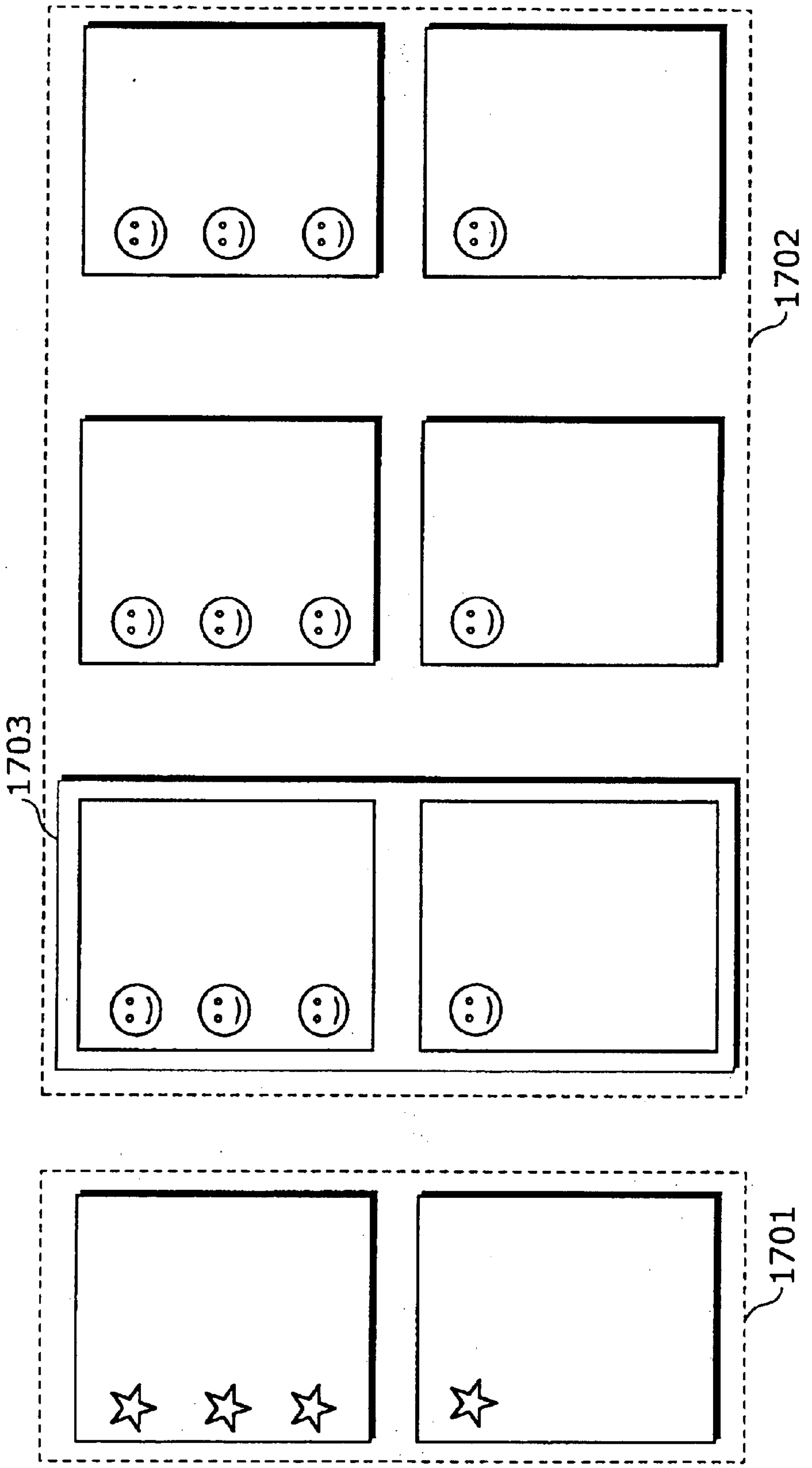
FIG. 18 is a diagram showing an example of printouts when carrying out two print jobs presented as job information 930 and job information 931 with a prior printing method.

FIG. 18 is a diagram showing an example of printouts when executing two print jobs that are shown in the job information 930 and the job information 931 by using a conventional printing method. If the two jobs are printed with the conventional method, two print sheets are used for a printout 1701 of the print job shown in the job information 930 as shown in FIG. 18, and furthermore, as for a printout 1702 of the print job shown in the job information 931, six pages of sheets are used for the printout 1702 which prints three units since a printout 1703 for printing only a part of the content 1400 needs two pages. Consequently, eight pages of sheets are needed in total. According to the printing system 800 of the second embodiment, however, it is apparent that the print sheets are used efficiently and that the reduction in the amount of the blank space is achieved. Print may be either a document file that is created with software for document production or a file that is described with markup language (for instance, HTML (Hyper Text Markup Language) used for building a homepage on the internet and BML (Broadcast Markup Language) used for a site creation for a digital broadcast or the like). The print system 800 is especially useful in the case of the file described with the markup languages since it is hard to know the number of pages at a glance or whether there is a need to print a host of sites continuously.

Third Embodiment

Figure 19:
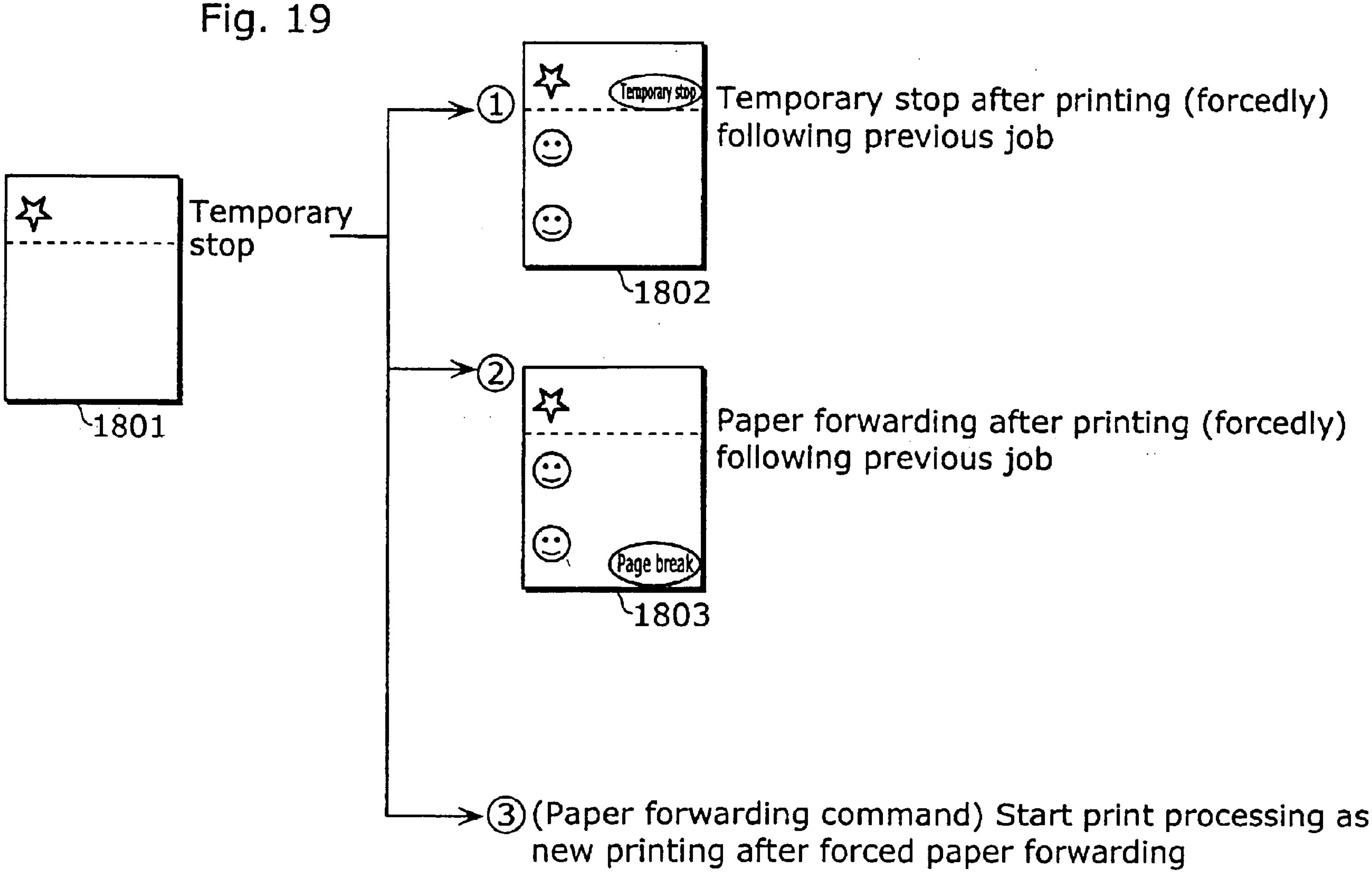
FIG. 19 is a diagram showing an example of a method of letting the printer 820, of which paper forwarding is suspended, forward a paper forcedly.

In the second embodiment, after receiving the print job shown in the job information 930 in which the temporary stop command is valid, the print job shown in the next-received job information 931 is always printed following the print job that is shown in the job information 930. In a third embodiment, however, with reference to FIG. 19, a case is explained of forcedly forwarding the print sheet that is suspended by the job information 930 so that the next print job may be executed. FIG. 19 is a diagram showing an example of a method of forwarding papers forcedly at the printer 820 which suspends paper forwarding. Three methods are introduced here as a method to complete the printing of the content 1000 so as to forcedly forward a print sheet 1801 which is suspended. First, a method is described for suspending the printing instead of forwarding the paper after forcedly printing the next print job starting from the position where the printing is suspended until the end of the page ((1)). in this case, paper forwarding for a print sheet 1802 is stopped while a part of the content 1400 is printed until the end of the page after the printing of the content 1000. Second, after the next print job is forcedly printed from where the printing is suspended until the end of the page, a print sheet 1803 of this page may be forwarded ((2)). in this way, the contents to be printed on the sheet where paper forwarding is suspended is the same as the print sheet 1802 of the first method, but the difference is that the forwarding of the sheet is performed instead of being stopped. A third method is not printing from the stopping position of the print sheet 1801, that is, forwarding the print sheet 1801 before executing the next print job so as to execute the next job as a new printing ((3)). With the method (3), the printout 1701 shown in FIG. 18 and a printout in which three units of the content 1400 are printed in succession starting from the top of the next print sheet, which is not shown in FIG. 19, are gained.

Figure 20:
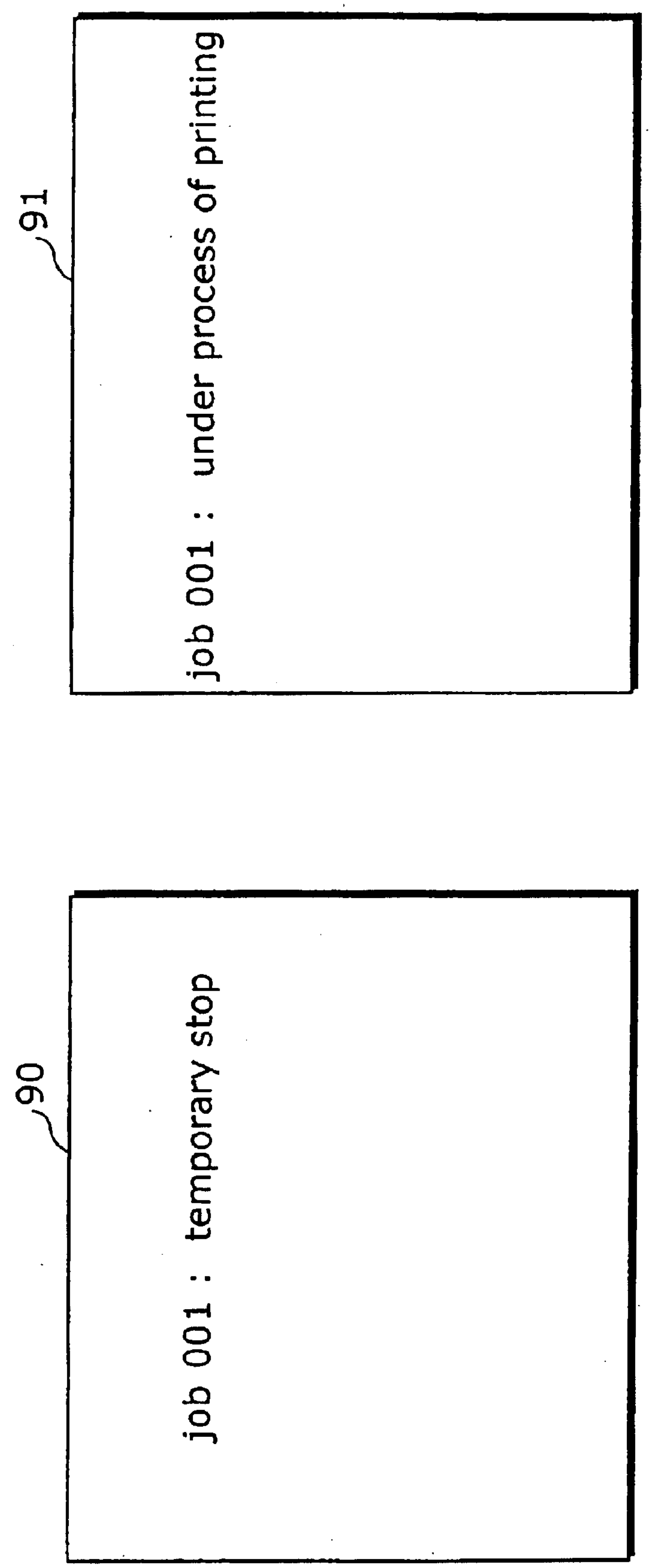
FIG. 20 is a diagram showing an example of a job status of the printer 820.

Also, seen from another standpoint, concerning the method of forcedly forwarding the print sheet 1801 of which the printing is suspended, the STB 810 may send a command of forced paper forwarding to the printer 820, whereupon the control unit 825 performs paper forward processing following this command. if the amount of blank space calculated by the blank space calculating unit 1501 is stored in the memory unit 822, the amount of blank space can be deleted or the printing of the job information 931 may be started from the top of the page having the maximum amount of blank space. A button for forcedly forwarding papers is prepared for the printer 820 as shown in FIG. 2, and forced paper forwarding may be executed when the button is pressed. The job status of the job information 930 of which the printing is suspended may be deleted. FIG. 20 is a diagram showing an example of a job status of the printer 820. When the status of the printer 820 after the printing concerning the job information 930 is suspended as shown in the item of a job status 90 of the job information 930 in FIG. 20, the Job status of job ID "Job 001" may be deleted after the forced paper forwarding so that no printing errors do not occur with regard to the job information 931 corresponding to the next job.

Figure 21:
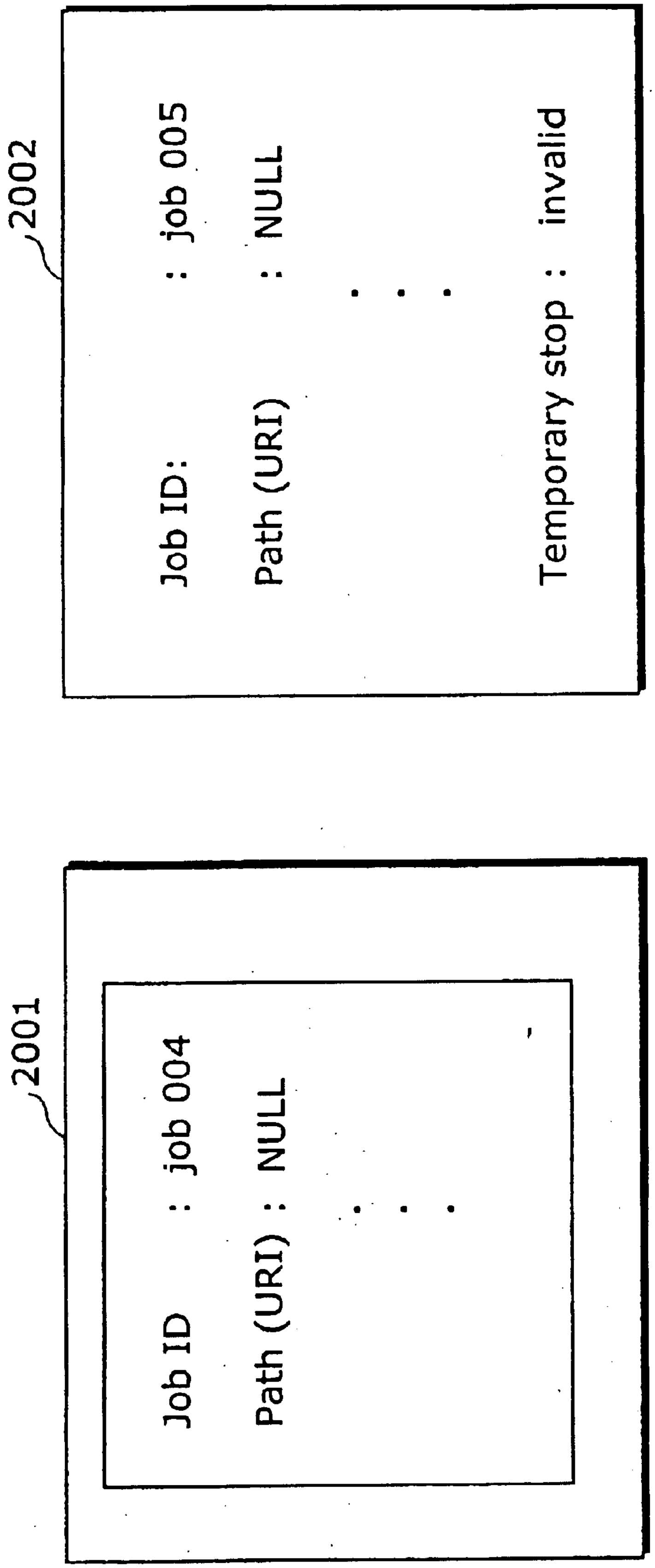
FIG. 21 is a diagram showing another example of the job status of the printer 820.

FIG. 21 is a diagram showing another example of the job status at the printer 820. The command of forced paper forwarding may not be sent as a command as described above, and job information 2001 which does not have (NULL) a path for to be printed as shown in FIG. 21 can be created at the JOB management unit 813. The printer 820 may perform forced paper forwarding by sending the created job information 2001 from the sending unit 814 to the printer 820. Also, the forced paper forwarding can be performed by invalidating the command of a temporary stop as in a case of job information 2002 which does not have a path for to be printed.

Figure 22:
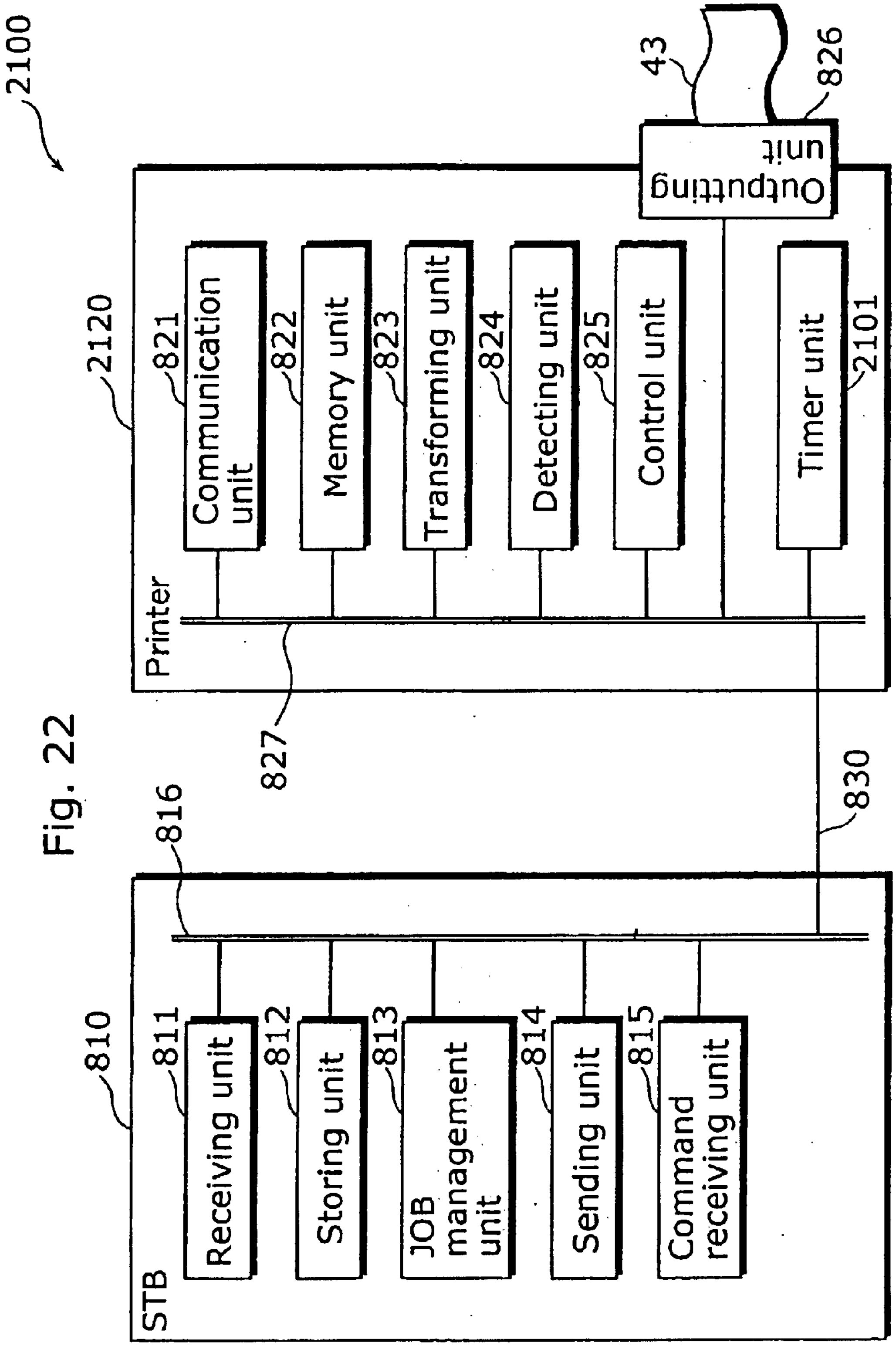
FIG. 22 is a block diagram showing a structure of a printing system 2100 according to a third embodiment of the present invention.

Also, other than the forced paper forwarding method described above, forced paper forwarding may be performed when a certain predetermined time has passed after the suspension. FIG. 22 is a block diagram showing a structure of a printing system 2100 of the third embodiment. A printer 2120 in the printing system 2100 differs from the printer 820 shown in FIG. 9 in that a timer unit 2101 is newly included. In the third embodiment, the timer unit 2101 is included in the printer 820 as shown in FIG. 22, the elapsed time after suspension (relative time) is gained, and three minutes, for instance, is set as the predetermined time so that the forced paper forwarding may be performed by the control unit 825 after three minutes has passed.

Fourth Embodiment

In the second embodiment, information regarding whether a temporary stop is valid or not is contained in the job information 930. Therefore, whether the print control 1001 containing a command of a temporary stop is created by the transforming unit 823 or not is determined according to this information regarding whether a temporary stop is valid or not, and the detecting unit 824 detects the temporary stop command in the print control data so that the control unit 825 performs the control of a temporary stop. However, the temporary stop cannot be performed once a job containing information in which a temporary stop is invalid is created at the JOB management unit 813 and sent to the printer 820. Only a command of a temporary stop can be sent from the STB to the printer so that the same processing may be performed as in a case in which the JOB management unit 813 sends a job in which a temporary stop command is valid to the printer 820.

Figure 23:
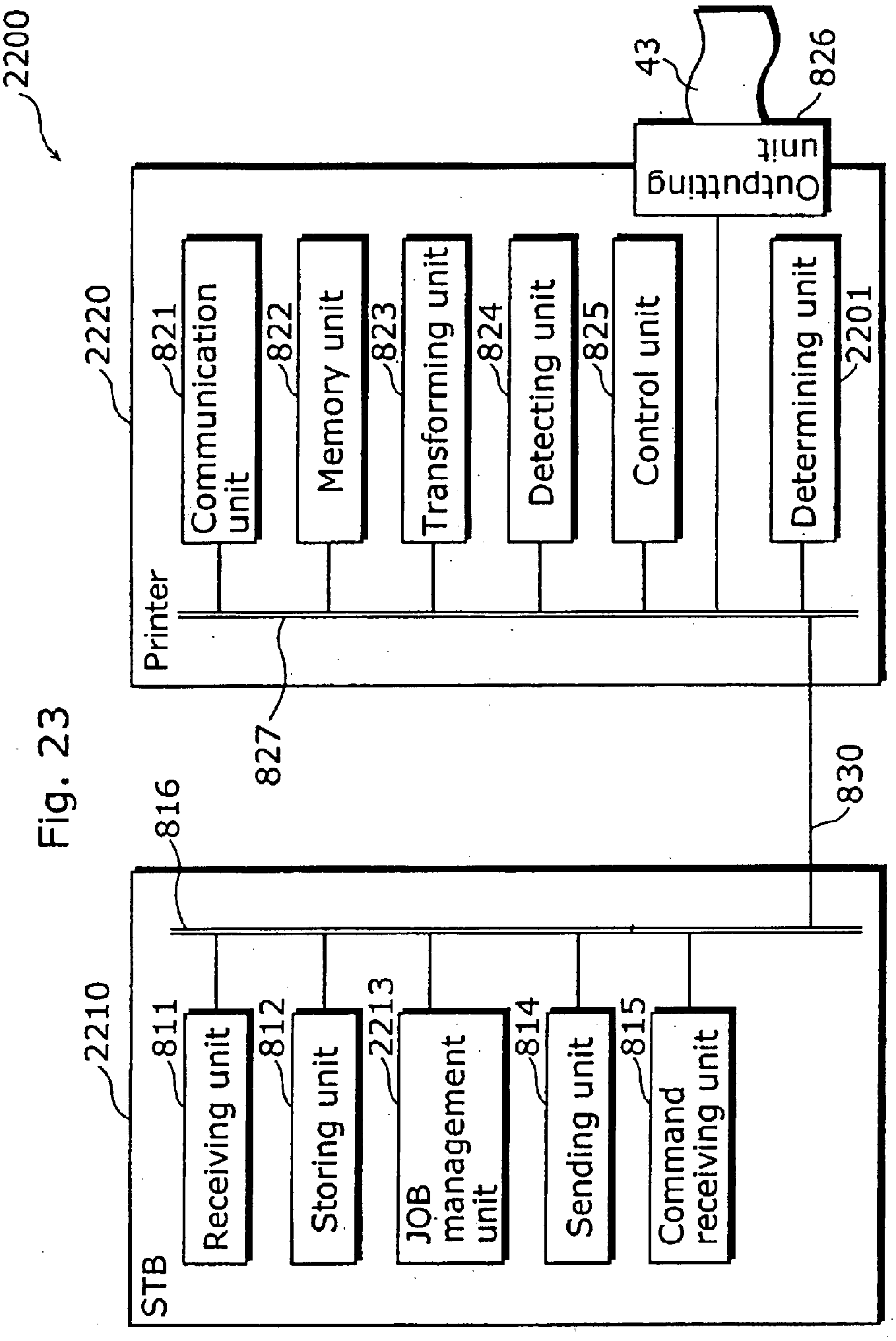
FIG. 23 is a block diagram showing a structure of a printing system 2200 according to a fourth embodiment of the present invention.

FIG. 23 is a block diagram showing a structure of a printing system 2200 according to a fourth embodiment. A printer 2220 of the printing system 2200 differs from the printer 820 of the second embodiment shown in FIG. 9 in that a determining unit 2201 is newly included. Also, a STB 2210 in the printing system 2200 differs from the STB 810 of the second embodiment shown in FIG. 9 in that a JOB management unit 2213 creates a command of a temporary stop separately from job information. In this case, the command of a temporary stop to be sent from the STB 2210 to the printer 2220 is determined by the determining unit 2201 shown in FIG. 23. When a command of a temporary stop is determined by the determining unit 2201, for instance, information on how many pages the sent print job is to print and the number of pages for which paper forwarding is already performed may be compared so as to see if the printer is printing the last page concerning the Job in process. If paper forwarding of seven pages is completed in a case of printing eight pages, the control unit 825 may operate paper forwarding after processing the last page since the processing of the next page is the last processing. As for the counting of the number of the pages, the blank space calculating unit 1501 (refer to FIG. 16) can be included as described in the second embodiment so as to calculate the distance of which the paper is forwarded and the paper size. Also, a feeding out detecting unit to detect feeding out of the sheets can be included so as to count the number of the pages already fed out. Meanwhile, it is desirable to perform a temporary stop in the fourth embodiment on a job-to-job basis.

Fifth Embodiment

The second embodiment describes a case in which the printing of the content 1000 and the content 1400 is suspended at an arbitrary position on the print sheet. However, the position of a temporary stop may be determined to be in the center of the page.

Namely, a page break is normally inserted for each page as shown in FIG. 15, but a page break can be inserted every half page, and a temporary stop can be operated by the control unit 825 in the case where the page break comes at the center of the page. In order to see if the break comes at the center of the page, the number of breaks can be counted, and if the number of breaks is an odd number, it is the case where the page break is at the center of the page, and if the number of breaks is an even number, it shows that the break comes at the end of the page.

Figures 24A, 24B:
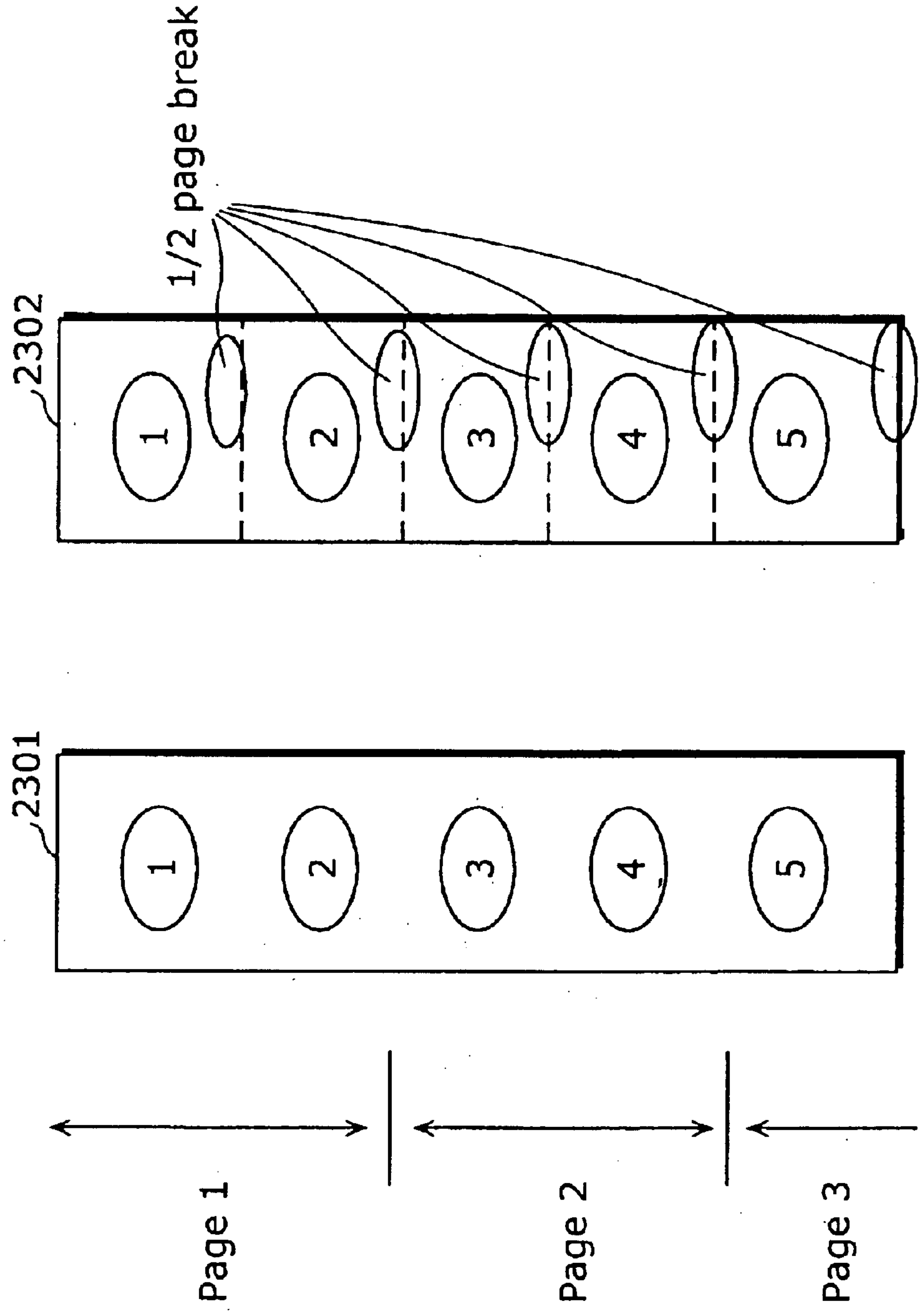
FIG. 24A is a diagram showing an example of a content printed with a printing method of a fifth embodiment of the present invention.
FIG. 24B is a diagram showing an example of print control data when printing the content shown in FIG. 24A according to the printing method of the fifth embodiment.

FIG. 24A is a diagram showing an example of a content to be printed by using a printing method of a fifth embodiment. FIG. 24B is a diagram showing an example of print control data when printing the content shown in FIG. 24A according to the printing method of the fifth embodiment. To be more concrete, when the content 2301 shown in FIG. 24A is printed, print control 2302 shown in FIG. 24B is created. Although a break after ① is a break that is inserted for the Nth number of times (N is presently an odd number), the printing is not suspended since the next is found, and the printer forwards the page since a break after ② is a break that is inserted for the Nth number of times (N is presently an even number). in the same way, a break after ③ is a break that is inserted for the Nth number of times (N is presently an odd number). Therefore, the printing is not suspended since the next data is found, and the printer forwards the page since a break after ④ is a break that is inserted for the Nth number of times (N is presently an even number), whereas a break after ⑤ is a break that is inserted for the Nth number of times (N is presently an odd number) and the printer does not find the next data, whereby the printer suspends the processing. After that, the printer 2220 forwards the paper when receiving a paper forwarding command but continues the printing when receiving a print job continuously after ⑤.

In this way, there is no need to calculate the amount of blank space according to the position of a temporary stop since the amount of blank space is specified depending on the paper size if the position is fixed. This lightens the creating processing of print control data in accordance with the amount of blank space for successive printing and can simplify a design of the system.

Sixth Embodiment

In the second embodiment, the method to create print control data using the printer 2 is described; however, a STB can be used as follows. In the STB, print control data is created so that it may be printed following a job 001 by obtaining a job status 91, which is a status of the print job shown in FIG. 20, since the information corresponding to the last job that was processed by the printer (FIG. 20 shows that the job 001 is under the process of printing) is a job 001, and the information corresponding to a temporary stop concerning this job 001 is valid (job information 930). The creation of this print control data can be performed either after the STB obtains, from the printer, the amount of the blank space that is calculated at the blank space calculating unit 1501 or using the amount of the blank space for the job 001 that is calculated in the STB. In either case, it is a printer that performs print processing according to the print control data.

The operation to send from data the STB to the printer, as described in the first to the sixth embodiments, can be either a push type (a pattern to send data which the STB stores from the STB to the printer) or a pull type (a pattern in which the printer obtains data which the STB stores).

Figure 25:
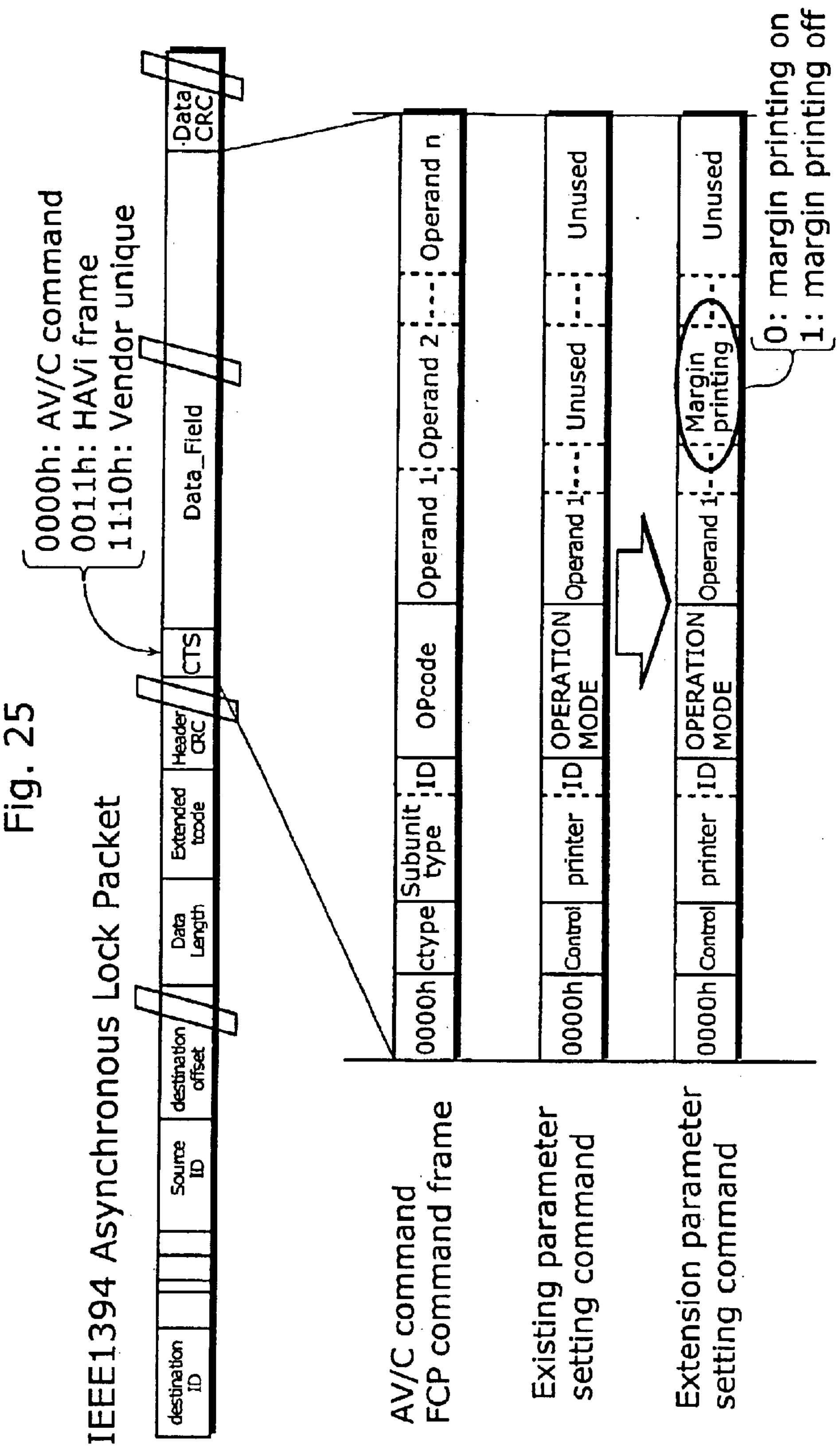
FIG. 25 is a diagram showing a design of a packet of an IEEE 1394 according to the present invention.

FIG. 25 is a diagram showing a design of a packet for an IEEE 1394 of the present invention. As for the commands for a temporary stop, for example, the unused packet area of the IEEE 1394 can be designed as follows: "0" when a temporary stop command is valid; and "1" when the temporary stop command is invalid.

The embodiments in which the printer suspends the printing after printing until the position where a temporary stop command is inserted in the second page as shown in FIG. 11B have been shown for printing the job information 930 in which the temporary stop command is valid. However, the print control 1407 shown in FIG. 15H can be created by using the that is stored in the memory unit 822 and the data for the content 1400 to be printed according to the job information 931 when printing the next job, the job information 931, by storing the data of the second page in FIG. 11B in the memory unit 822 instead of printing the data of the second page. Therefore, a temporary stop in this case means stopping while storing the rest of the data for printing in the memory unit 822 without completing the print job shown in the job information 930, and the temporary stop in this case differs from stopping paper forwarding that is in process after a completion of one print job. If a forced paper forwarding command is received under the condition that data is stored in the memory unit 822, the outputting unit 826 prints the data that is stored in the storing unit 822 so as to print anew the next job.

In order to see if it is a printing of a page containing a temporary stop command, for example, information corresponding to how many pages of printing the sent print job deals with and the number of pages already forwarded may be compared. If the paper forwarding of seven pages for the printing of eight pages is already finished, data regarding processing of the next page (the last page) is to be stored in the memory unit 822.

Also, a structure of a printer is not limited to what is described in the above-mentioned embodiments, and any structure possessing the functions shown in the above-mentioned embodiments can be used.

The present invention can be realized not only as a TV broadcasting station, a STB and a printing apparatus as described above, but also as a system consisting of these apparatuses or as a method to have the above-mentioned characteristic units included in each apparatus as steps. The present invention can also be realized as a program which causes a computer to execute these steps. The characteristic broadcasting data, which contains the print and the display data, can surely be distributed not only through a broadcasting network but also through a communication network such as the Internet or by being stored in a storage media such as a CD-ROM.

What is claimed is:

1. A printing apparatus for printing a plurality of pictures on a plurality of printing areas obtained by sectioning a print sheet, said printing apparatus comprising:

a picture receiving unit operable to receive a plurality of pictures to be printed;

a printing unit operable to print a received picture on a respective printing area among the plurality of printing areas;

a print control unit operable to stand by until said picture receiving unit receives a picture among the plurality of pictures to be printed when all the pictures to be printed in the plurality of printing areas have not been received by said picture receiving unit, to cause said printing unit to execute printing of the pictures when a number of pictures that are received correspond to a number that are printable in the predetermined printing areas, and to stand by again; and a paper forwarding control unit operable to temporarily stop paper forwarding of the print sheet partway through the print sheet at a top of a printing area in which a picture is not yet printed while said print control unit is standing by after printing on the respective printing area among the plurality of printing areas is terminated.

2. The printing apparatus according to claim 1, further comprising a print setting input unit operable to receive a user input of a print setting for specifying a method of sectioning the print sheet; and wherein said paper forwarding control unit temporarily stops paper forwarding of the print sheet at a center position of the print sheet when the print sheet is predetermined to be sectioned into two printing areas according to the print setting and a print ending position of the received pictures is in an area between a top position and a center position of the print sheet.

3. The printing apparatus according to claim 2, wherein said paper forwarding control unit includes a timer unit operable to measure a period of time between a receipt of a first picture and a receipt of a second picture which follows the first picture, and said paper forwarding control unit is operable to forward the print sheet of which paper forwarding has been temporarily stopped when the time measured by said timer unit surpasses the predetermined time.

4. The printing apparatus according to claim 2, wherein the plurality of the pictures are obtained by capturing pictures on a TV screen.

5. The printing apparatus according to claim 1, further comprising a print setting receiving unit operable to receive a user input of a print setting for specifying a method of sectioning the print sheet, and wherein said printing unit is operable to print a received picture among the plurality of pictures to be printed on the printing area according to the received print setting.

6. The printing apparatus according to claim 1, further comprising a print setting receiving unit operable to receive a user input of a print setting for specifying a method of sectioning the print sheet;

wherein said printing unit is operable to print the received pictures according to the received print setting, and said paper forwarding control unit is operable to temporarily stop paper forwarding of the print sheet at a center position of the print sheet when the print sheet is predetermined to be sectioned into two printing areas according to the print setting and a print ending position of the received pictures is in an area between a top position and a center position of the print sheet.

7. A printing method for printing a plurality of pictures on a plurality of printing areas obtained by sectioning a print sheet, said printing method comprising:

receiving a plurality of pictures to be printed;

a received picture on a respective printing area among the plurality of printing areas;

standing by for the reception of picture among the plurality of pictures to be printed in said receiving of the plurality of pictures to be printed when all the pictures to be printed in the plurality of printing areas have not been received, executing a printing of a picture in said printing of the received picture when a number of pictures that are received correspond to a number that are printable in the predetermined printing areas, and standing by again;

temporarily stopping paper forwarding of the print sheet partway through the print sheet at a top area in which a picture is not yet printed while said standing by is standing by after printing in the respective printing area among the plurality of printing areas is terminated.

8. A program for a printing apparatus which prints a plurality of pictures on a plurality of printing areas obtained by sectioning a print sheet, said program causing a computer to execute:

receiving a plurality of pictures to be printed;

printing a received picture on a respective printing area among the plurality of printing areas;

standing by for the reception of a picture among the plurality of pictures to be printed in said receiving of the plurality of pictures to be printed when all the pictures to be in the plurality of printing areas have not been received, executing a printing of a picture in said printing of the received picture when a number of pictures that are received correspond to a number that are printable in the predetermined printing areas, and standing by again;

temporarily stopping paper forwarding of the print sheet partway through the print sheet at a top area in which a picture is not yet printed while said standing by is standing by after printing in the respective printing area among the plurality of printing areas is terminated.

9. A printing apparatus for printing a plurality of pictures on a plurality of printing areas on at least one printing sheet, said apparatus comprising:

a picture receiving unit operable to receive a plurality of pictures to be printed;

a printing unit operable to print a received picture on a respective printing area among the plurality of printing areas;

a print control unit operable to cause said printing unit to execute printing of the received pictures when the pictures are received by a number corresponding to the number of printing areas which are obtained by sectioning the least one print sheet, and to cause said printing unit to stand by until at least one intended picture is received; and a paper forwarding control unit operable to temporarily stop paper forwarding of the at least one print sheet partway through the print sheet at a top of a printing area in which a picture is not yet printed while said print control unit is standing by after printing in the respective printing area among the plurality of printing areas is terminated.

10. A printing method for printing a plurality of pictures on a plurality of printing areas on at least one printing sheet, said method comprising:

receiving a plurality of pictures to be printed;

printing a received picture on a respective printing area among the plurality of printing areas;

causing said printing of the received picture to execute printing of the received pictures when the pictures are received by a number corresponding to the number of printing areas which are obtained by sectioning the at least one print sheet, and causing said printing of the received picture to stand by until at least one intended picture is received; and temporarily stopping paper forwarding of the at least one print sheet partway through the at least one print sheet at a top of a printing area in which a picture is not yet printed while said printing of the received picture is standing by after printing in the respective printing area among the plurality of printing areas is terminated.

* * * * *

UNITED STATES PATENT AND TRADEMARK OFFICE

CERTIFICATE OF CORRECTION

PATENT NO. : 6,789,962 B2 
DATED : September 14, 2004
INVENTOR(S) : Shigeki Matsunaga et al.

It is certified that error appears in the above-identified patent and that said Letters Patent is hereby corrected as shown below:

Column 20,
Line 12, please insert -- a -- after "for the reception of",
Line 36, please insert -- printed -- after "pictures to be".

Signed and Sealed this

Eighteenth Day of January, 2005

JON W. DUDAS
*Director of the United States Patent and Trademark Office*